United States Patent [19]

Bluethman et al.

[11] 4,064,557

[45] Dec. 20, 1977

[54] SYSTEM FOR MERGING DATA FLOW

[75] Inventors: Robert Glenn Bluethman, Austin; Michael Eudell McBride, Leander; Wayne Finis Rogers, Austin, all of Tex.

[73] Assignee: International Business Machines Corporation, Armonk, N.Y.

[21] Appl. No.: 595,840

[22] Filed: July 14, 1975

Related U.S. Application Data

[63] Continuation of Ser. No. 439,785, Feb. 4, 1974, abandoned, which is a continuation-in-part of Ser. No. 194,418, Nov. 1, 1971, abandoned.

[51] Int. Cl.² .................................................. G06F 7/32
[52] U.S. Cl. .................................................. 364/900
[58] Field of Search .................... 340/172.5; 445/1; 197/19, 55; 364/200, 900; 101/1, 2

[56] References Cited

U.S. PATENT DOCUMENTS

| | | | |
|---|---|---|---|
| 2,947,976 | 8/1960 | Mondelson et al. | 340/172.5 |
| 2,969,913 | 1/1961 | Cherin et al. | 235/157 |
| 3,017,610 | 1/1962 | Auerbach et al. | 340/172.5 |
| 3,235,848 | 2/1966 | King et al. | 340/172.5 |
| 3,343,133 | 9/1967 | Dirks | 340/172.5 |
| 3,675,216 | 7/1972 | James | 340/172.5 |
| 3,694,813 | 9/1972 | Loh et al. | 340/172.5 |
| 3,696,343 | 10/1972 | Schloss | 340/172.5 |

Primary Examiner—Mark E. Nusbaum
Attorney, Agent, or Firm—James H. Barksdale, Jr.; Douglas H. Lefeve

[57] ABSTRACT

A system for merging data flow having a typewriter electronically connected to a buffer, which is a dynamic electronic shift register, for inputting data into sections of the buffer and for merging the data in the sections into a single printout. System control logic is provided to allow (1) a separator, or partition, code to be input into the buffer for defining sections (2) codes corresponding to hold and operation flags to be input into the sections, and (3) text data codes corresponding to characters and switching and/or stopping points to be input into the sections. In addition, the system control logic is operable to allow the operator to insert characters into and delete characters from the sections of the buffer for text editing and revision. The sectioned buffer formed by the input of a separator code, or flag, can also be in electronic association with a record reader, or reader-recorder, such that the operator, by depressing a section store button and operating an alternate section button, can store the contents of records such as cards, tapes, etc., into the desired section of the buffer. With the codes and characters stored in the buffer, the section containing the first text to be printed is addressed, printout is initiated from the operation flag and continues until a switch code is encountered. Then the positions of the hold and operation flags contained in the two different sections are automatically exchanged and printout continues in the other section from the operation flag with the result being the merging of text stored in the sections.

10 Claims, 22 Drawing Figures

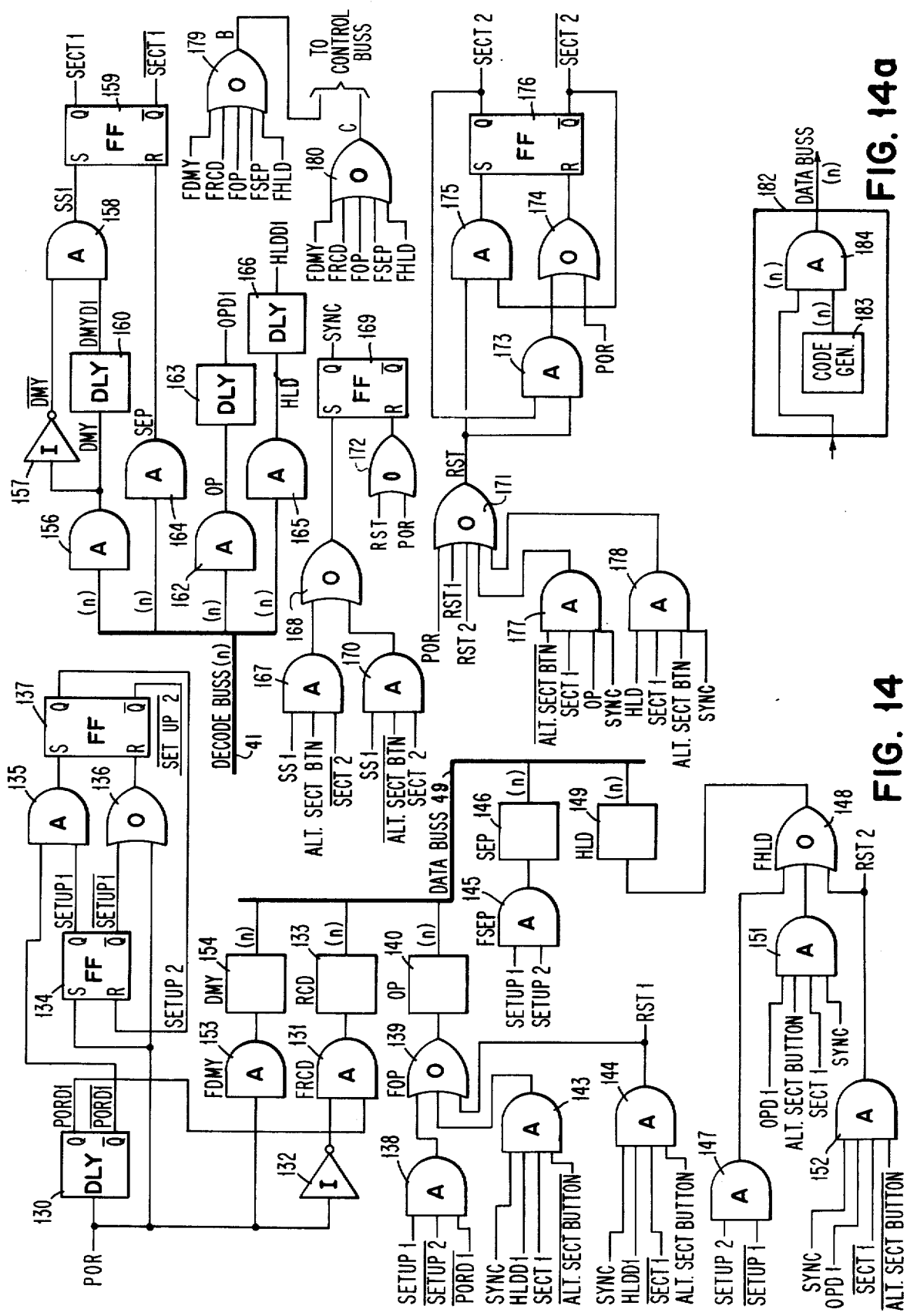
FIG. 14
FIG. 14a

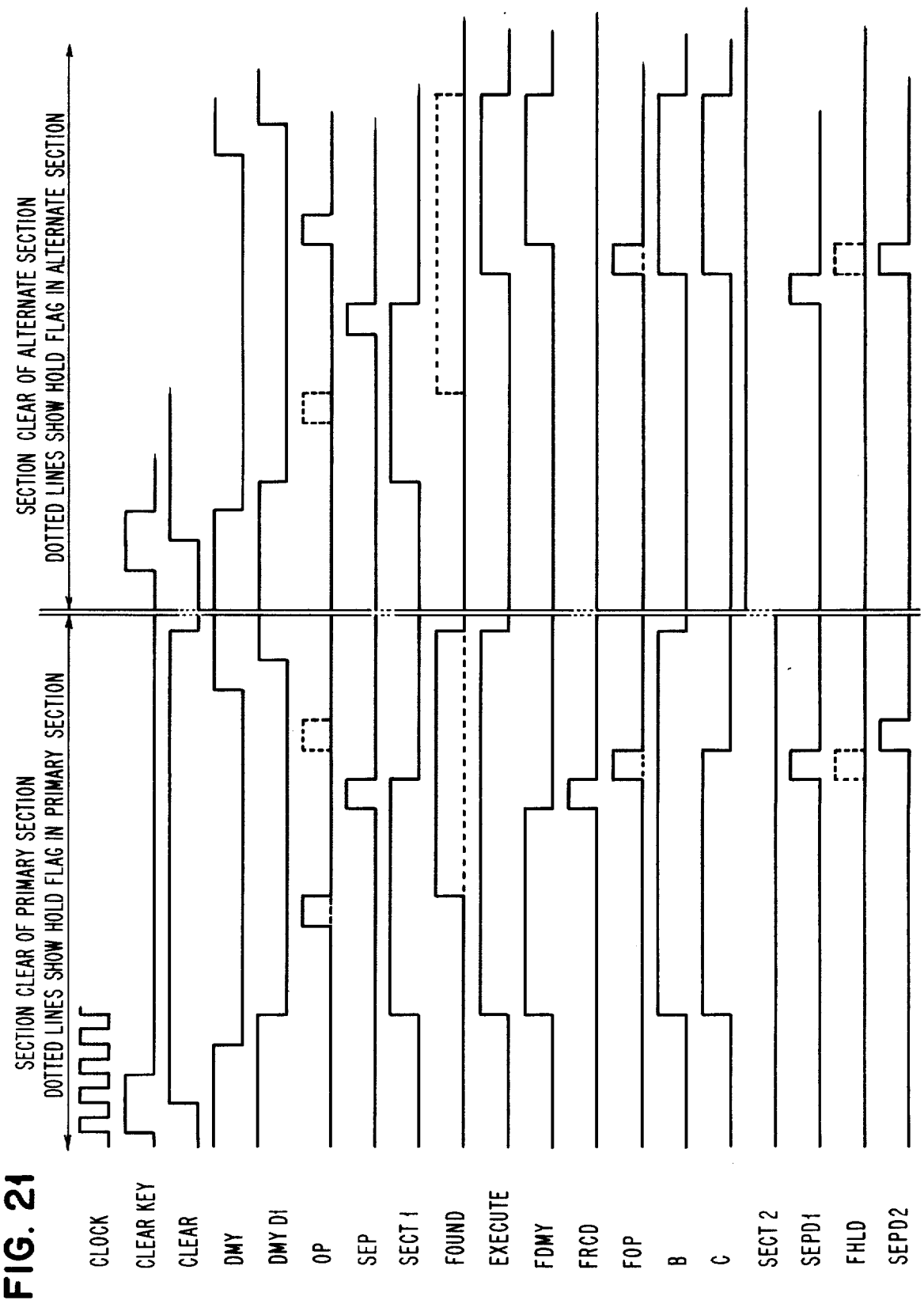

SYSTEM FOR MERGING DATA FLOW

This is a continuation, of application Ser. No. 439,785 filed Feb. 4, 1974, now abandoned, which is a continuation-in-part of application Ser. No. 194,418, filed Nov. 1, 1971, now abandoned.

BACKGROUND OF THE INVENTION

1. Field of the Invention

This invention relates to printing systems in general, and more specifically to a merging type of printing system which utilizes an electronic buffer having sections containing text data which is to be merged automatically during printout. The text contained in one of the sections is merged with the text in the other section under the control of switch codes recorded and stored along with the text stored in the sections. Operation and hold flags input to the buffer are the addresses of the location of the present text and the next text in the other section defined by the switch codes.

2. Description of the Prior Art

The prior art devices include the Magnetic Tape "Selectric"* Typewriter. One of the problems encountered when utilizing a single tape Magnetic Tape "Selectric"* Typewriter (MT/ST) is that when a revision is to be made, the revision cannot be more extensive than the original recording or the previously recorded material will be overrun. This problem was alleviated on the MT/ST by providing a second tape and transferring the contents of the original tape to the second tape along with revisions (insertions and deletions) performed during the transfer.

*Registered Trademark, International Business Machines Corporation

However, the problem of addressing blank blocks on the tape for insertion of data is still present. Also, during scanning, the encounter of blank positions requires time for reading or special logic to skip these blank positions. The present invention, although functionally similar to the two station MT/ST, improves on the MT/ST system in that due to the structure of the dynamic shift register, the data is packed so that no blank spaces in text are present. In addition, the memory cycle is very short, and therefore, the data in the buffer can be readily scanned such that correction of improperly recorded material is easily handled.

Also, for further background of systems control and associated usage of electronic shift registers, referenceis made to copending U.S. patent application Ser. No.'s 104,888; 158,346; and 158,347; now U.S. Pat. Nos. 3,675,216; 3,753,239; and 3,781,813, respectively, all assigned to the assignee of this application.

SUMMARY OF THE INVENTION

An input/output typewriter is electronically connected to a buffer which in the preferred embodiment is a dynamic shift register. System control logic is provided to allow the operator to type codes corresponding to characters into the buffer as well as switch codes for later control of printout. In addition, the system control logic is operable to allow the operator to insert characters into and delete characters from the buffer for editing, updating, and revision purposes. The buffer can also be in electronic association with a record-reader or bulk store such that the operator, by operating an alternate section button, can store the contents of a record into a section of the buffer. At the beginning of operation, the buffer is first loaded with control codes such as operation, separator, and hold flags, respectively, and then with text and associated switch codes from record cards or other media, and/or by operator keying. A record flag can be stored in one of the sections to define an output position when the buffer is in association with a reader-recorder. The separator code defines the two sections in the buffer which are loaded with the text and switch codes. The operation flag defines the beginning of the remaining text (to be presently printed out) and a switch code defines the end of that text in one section, and the hold flag defines the beginning of text to be addressed in the other section. The encountering of a switch code in the data flow effectively will result in the position of the operation and hold flags being exchanged with the hold flag always being the address of the next character to be read when another switch code is encountered or when the operation of the alternate section button causes a change of the sections addressed. That is, the hold flag is replaced with another operation flag and the original operation flag is replaced with another hold flag upon encountering a switch code or by operating the alternate section button. Therefore, the data flow including flags and switch codes in the shift register are used to generate automatically a composite piece of work made up of text arranged in the desired order. Also, the printout can be under the control of the operator by the system control logic causing stoppage of printout upon encountering a stop code. In this case, the next text is addressed manually by the operator operating the alternate section button. In one mode of operation, the encounter of a switch code causes the operation and hold flags to be exchanged by automatically deleting and/or writing thereover. In another mode of operation, stop codes allow the flags to be manually exchanged. In either mode of operation, the contents of the sections in the buffer are printed out alternately in the order in which they were stored.

The system is designed such that operation in one section will not affect the operation in the other. When text stored in one section is no longer needed, the section can be cleared by the operator addressing that section through operating the alternate section button, and then depressing a section clear button.

With the above system configuration the operator need not be concerned with storage locations in the sections after set up since printout from the sections can be automatic under control of the system control logic acting in conjunction with the flags and switch codes stored in the buffer such that an alternate and sequential printout from the sections occurs to produce a composite piece of work.

BRIEF DESCRIPTION OF THE DRAWING

FIGS. 14, 16, 18, and 20 are detailed logic diagrams of a preferred embodiment of the operations described by the flow charts in FIGS. 9-10, 11, 12, and 13, respectively;

FIG. 14a shows a logical implementation of a code generator that may be utilized for the code generators in FIGS. 14, 16, 18, and 20; and FIGS. 15, 17, 19, and 21 are timing diagrams illustrating the sequence of operation of the logical elements of FIGS. 14, 16, 18, and 20.

DESCRIPTION OF THE PREFERRED EMBODIMENT

Figure 1:
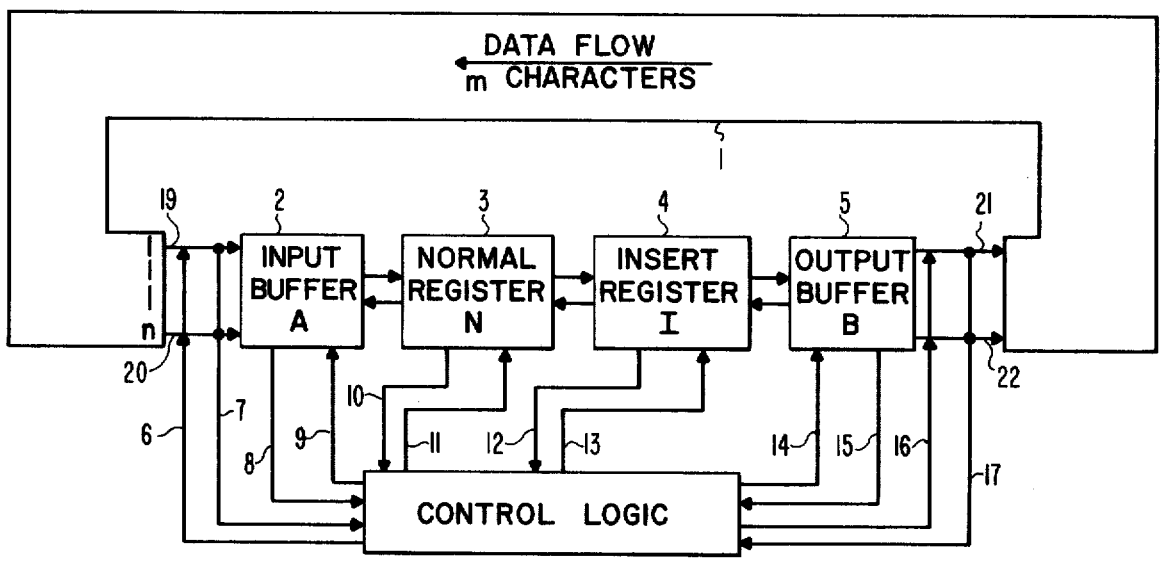
FIG. 1 is a generalized block diagram showing a shift register with certain buffers connected between its input and output stages which are controlled by a control unit to accomplish alteration of the data paths for timewise shifting of the data for insertion or deletion of characters, flags, and codes.

For a more detailed description of the invention, reference is first made to FIG. 1 wherein there is shown a generalized block diagram of a system being part of the above system and employing four registers between the input and output stages of a shift register. As shown, the shift register 1 is of *m* characters in length and each character may be *n* bits in width. The data as depicted moves in a counterclockwise direction, and comes out of the final stage of lines 19 and 20 and is applied to an input buffer 2. This buffer, during the subsequent description of data flow, to simplify the description, is labeled A. Buffers and registers subsequently to be described are also designated with briefing characters N, I, and B. The output from the shift register is also applied along line 7 to a control logic unit and as shown the control logic unit can also apply data along line 6 to lines 19 and 20. In the subsequent description, while lines such as 6 and 7 are shown as single lines, it should be understood that there are actually as many lines as each character is wide. Input buffer 2 is also connected to normal register 3 and as shown can both provide data to normal register 3 and accept data from register 3 which is designated the N buffer. The input buffer 2 is also in two way communication with the control logic along lines 8 and 9 and as shown normal register 3 is likewise in two way communication with the control logic along lines 10 and 11. Further, as shown the normal register is in two way communication with insert register 4 which likewise is in two way communication along lines 12 and 13 with the control logic. Finally, insert register 4 is in two way communication with output buffer 5 which is also in two way communication along lines 14 and 15 with the control logic. Again, as shown the control logic is in two way communication with lines 21 and 22 along lines 16 and 17 which connect the input stage of the buffer to the control logic.

With this generalized block diagram, data flow is under the control of the control logic and the control logic as illustrated (1) takes the data from the output stage of the shift register and channels it into the appropriate register A, N, I or B to control timewise shifting, (2) applies data to the input stage of the register along lines 21 and 22, (3) takes data from the output of any register, or (4) causes data to be applied to any shift register to accomplish any of the required functions associated with the task to be performed. The generalized flow of FIG. 1 is shown merely to illustrate that the control logic accepts data from the various lines and buffers and channels the data to the appropriate registers to cause insertion, deletion, etc., of characters.

Figure 2:
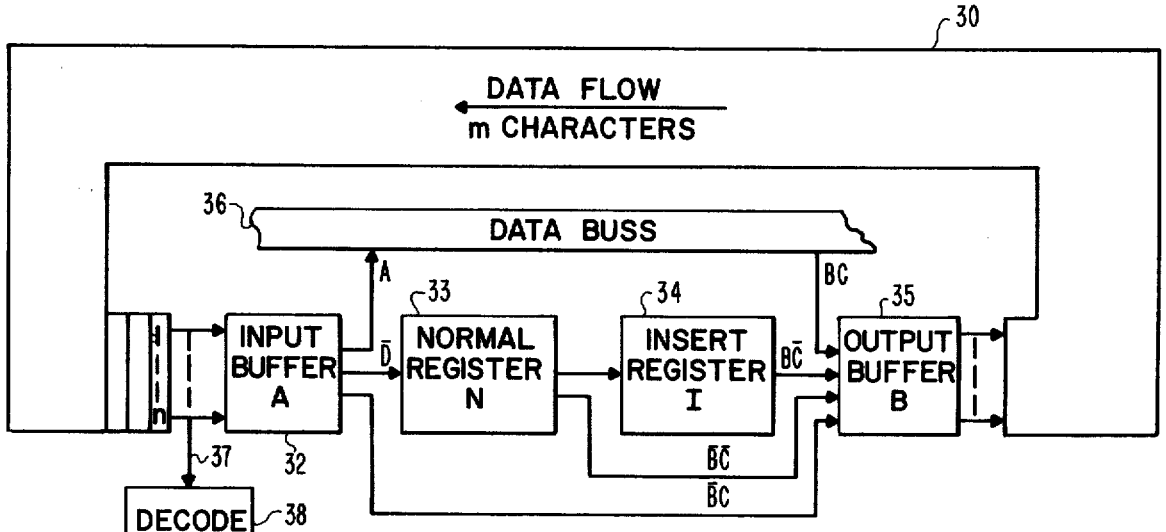
FIG. 2 is another block diagram illustrating a preferred embodiment of the subject shift register and control technique.

In FIG. 2 is shown a preferred embodiment of a system generally in accordance with the generalized diagram of FIG. 1, but which is much more efficient than the system of FIG. 1 in that the system of FIG. 2 does not directly control the data flow by bringing the characters into the control logic, but instead by selective actuation of four logical lines can cause the completion of editorial tasks such as insertion of characters, deletion of characters, error correct backspace, and other functions normally found in revision systems.

As shown in FIG. 2, a shift register 30 has a data flow in the counterclockwise direction such that the output of the shift register is applied to an input buffer 32 again labeled A. The output from the shift register is also applied along line 37 to a decode unit 38 which decodes the characters and provides an indication to the control logic, not shown, as to which characters are at the output of the shift register. As will later be discussed in more detail, the control codes which facilitate the highly simplified logical control hereinafter described include dummy codes, delete characters, separator, hold, operation, and record flags and switch codes. The output from the input buffer A can be applied under logical control to line $\overline{B}$ C which causes the data to flow from input buffer A to an output buffer 35. Additionally, data from the input buffer 32 may be applied along line $\overline{D}$ to normal register 33.

Input buffer 32 is also, as shown, connected along line A to a data buss 36. Data buss 36 in turn is connected along line BC to the output buffer 35. The data buss is shown in general form and its specific configuration will depend upon the type of apparatus connected to the shift register. That is, the data buss may in effect be the character output register and the input register of a typewriter. The normal register 33 is as shown connected along line $\overline{BC}$ to the output buffer 35 and is also connected to the insert register 34. The insert register 34 is also connected along line $\overline{BC}$ to the output buffer 35. These various lines such as $\overline{BC}$ are labeled in accordance with the logical control signals which must be applied to control the flow of the data along the designated path. These notations are in accordance with those used in the detailed schematic of FIG. 4.

Figure 3:
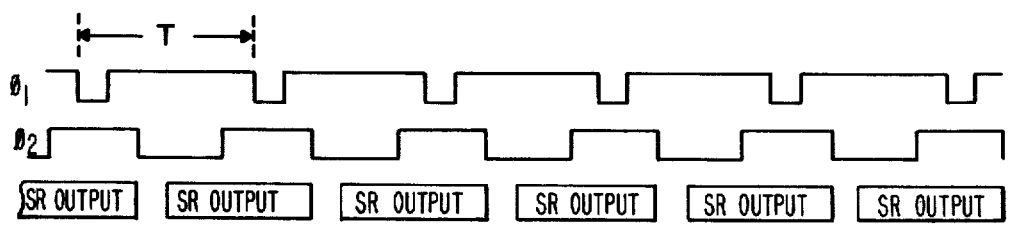
FIG. 3 is a timing diagram illustrating the timing of the two phase clock employed which causes data to shift and be set in the register along with an illustration of the time of valid shift register output.

FIG. 3 shows the basic timing employed in the shift register system. Shown in the output of a two phase clock $\phi_1$ and $\phi_2$; T illustrates the cycle time. The falling edge of $\phi_1$ is used to set data into the various buffers while the falling edge of $\phi_2$ defines the output of data from the shift register. As shown the shift register output is not available for a short time following the falling edge of the $\phi_2$ clock.

Figure 4:
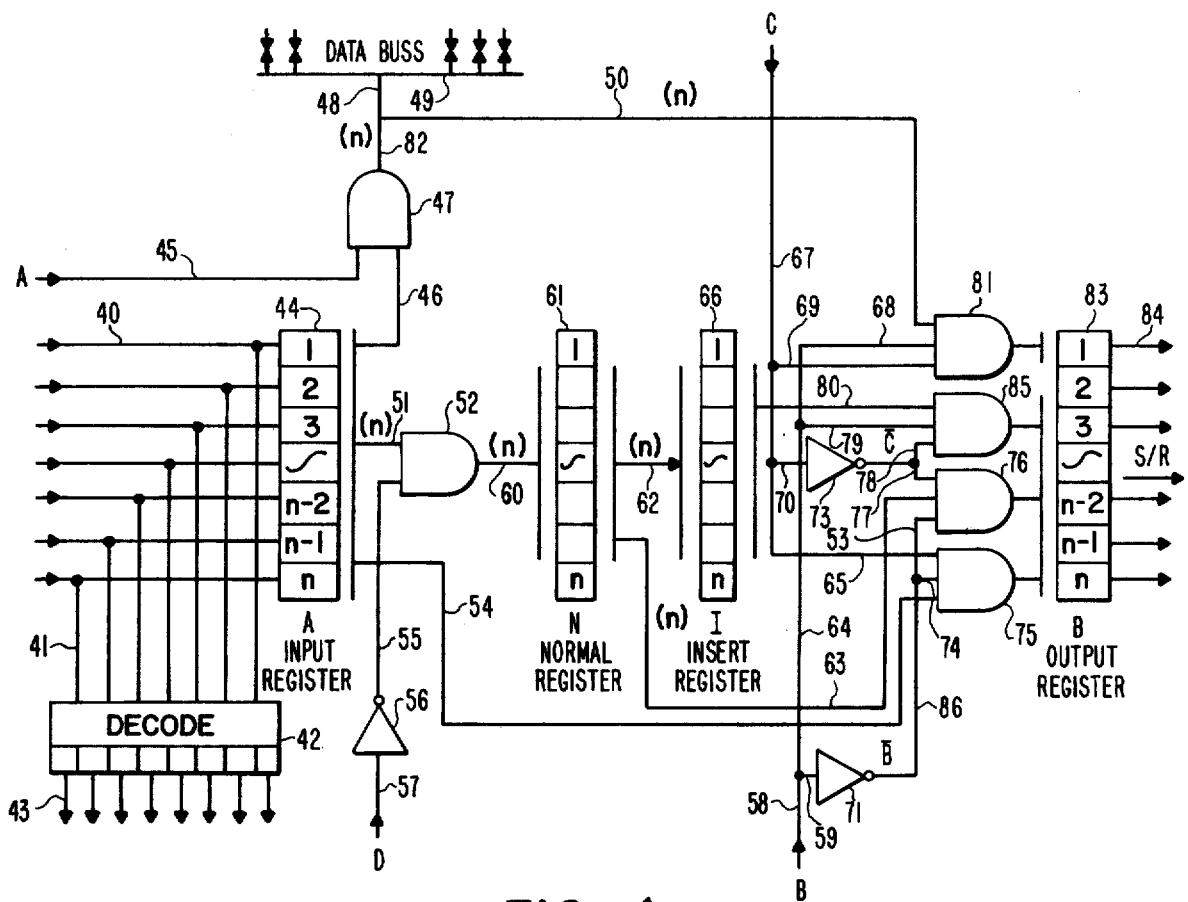
FIG. 4 is a detailed drawing of the preferred embodiment of the shift register of FIG. 2.

For a more detailed description of the subject shift register and control technique, and for an operational description thereof, reference is made to FIG. 4. In FIG. 4 are lines 40 which represent the output lines from the output stage of the shift register and lines 84 which are connected to the input stage of the shift register. Lines 40 from the output stages of the shift register are applied to the input register 44. The input register 44 is as shown for n stages. The output from the shift register applied to lines 40 is also applied along decode buss 41 to the decode unit 42 which has its output applied along lines 43 to the control logic. As previously discussed, decode unit 42 decodes the characters appearing on the output lines 40 and provides decoded information to the control logic. More specifically, as will later become apparent the characters decoded by decode unit 42 include dummy codes, delete codes, separator, hold, operation, and record flags, and switch codes.

The output from the input register 44 is as shown applied along line 46 to AND gate 47 which in turn receives the A logical input along line 45 from the control unit. Thus, application of a positive logic logical level to line 45 will cause the character appearing on line 40 to pass through AND gate 47 along lines 82 and 48 to the data buss 49. The data appearing on lines 40 is also applied along line 51 to AND gate 52 which receives another input along line 57 through inverter 56 and along line 55. Thus, application of a positive logical level to line 57 results in AND gate 52 inhibiting passage of data from the input register 44 onto line 60 and into the normal register 61 while application of a negative logical level or $\overline{D}$ to line 57, acting through inverter 56, causes line 55 to apply a positive logical level to AND gate 52 and thus allows the data from input register 44 to pass into normal register 61.

The contents in the input register 44 are also applied along line 54 to AND gate 75.

The contents of input register 44 which pass through AND gate 52 and along line 60 into the normal register 61 when a low logical level is applied to line 57 are applied along line 62 to the insert register 66. The same data also passes along line 63 to AND gate 76. The data in insert register 66 is also applied along line 80 to AND gate 85.

As shown, a C logical signal is applied along line 67 to lines 69 and 70. Line 69 constitutes another input to AND gate 81 while the signal applied on line 70 through inverter 73 is applied to both AND gates 85 and 76. Further, the B logical signal which is applied on line 58 is also applied along lines 64 and 79 to make up the third input to AND gate 85 and along lines 64 and 68 to make up the third input to AND gate 81. The B logical signal is also applied along line 59, through inverter 71, and along lines 86 and 74 to AND gate 75 and along lines 86 and 53 to AND gate 76. The outputs of AND gates 75, 76, 81, and 85 are applied to the output register 83 which is connected to the input lines 84 of the shift register.

Thus, from the above, it will be seen that application of a positive logical level to the D line 57 will result in the contents of the A input register 44 being inhibited from passing through AND gate 52 while application of low logical level or $\overline{D}$ signal to line 57 will cause the contents of the input register 44 to be passed through AND gate 52 to the normal register 61. Further, the contents of the normal register 61 always are applied to the insert register 66 and are selectively gated into AND gate 85 by application of a positive logical level to line 58 which is the B logical signal along with the application of a low logical level to line 67 which is the C logical signal.

Thus, unless the B signal is true and C signal not true the data in insert register 66 will not pass through AND gate 85 to the output register 83.

In addition, as previously described, when the A logical signal is true, the data from the input register 44 is passed through AND gate 47 to the data buss. For input from the data buss 49, AND gate 81 gates data from the data buss 49 along line 50. This will occur as shown when the B and C logical signals are true. Further, data can be gated directly from the normal register 61 along line 63 through AND gate 76 by application of the $\overline{C}$ signal to AND gate 76 in conjunction with the application of a $\overline{B}$ signal to line 58 which, through inverter 71 is inverted to cause the conditions into AND gate 76 to be met to pass the information from the normal register 61 into the output register 83. Finally, data from the input register 44 can be passed directly along line 54 through AND gate 75 by application of a $\overline{B}$ signal to line 58 in conjunction with the application of a C logical signal. This will cause the data to pass directly from the input register 44 into the output register 83.

The normal data path that the data takes when there is no data manipulation involved in the flow of data from the output stage to the input stage of the shift register is from the output stage of the shift register to the A register, then along the $\overline{D}$ path to the N register, and then, bypassing the insert register, along the $\overline{BC}$ path to the B register and then into the input stage of the shift register.

Figure 7:
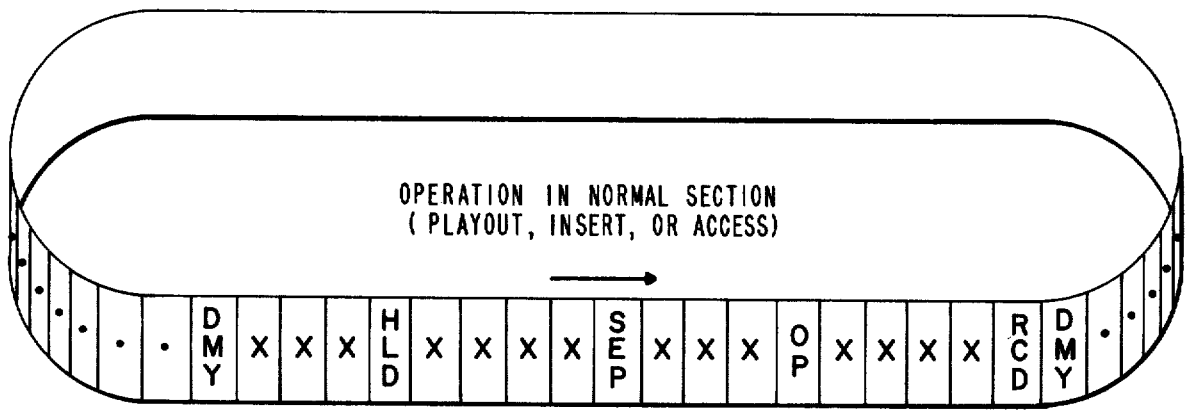
FIG. 7 is a drawing illustrating the operation in one of the sections of the buffer and the positions of the operation and hold flags relative to the data.
Figure 10:
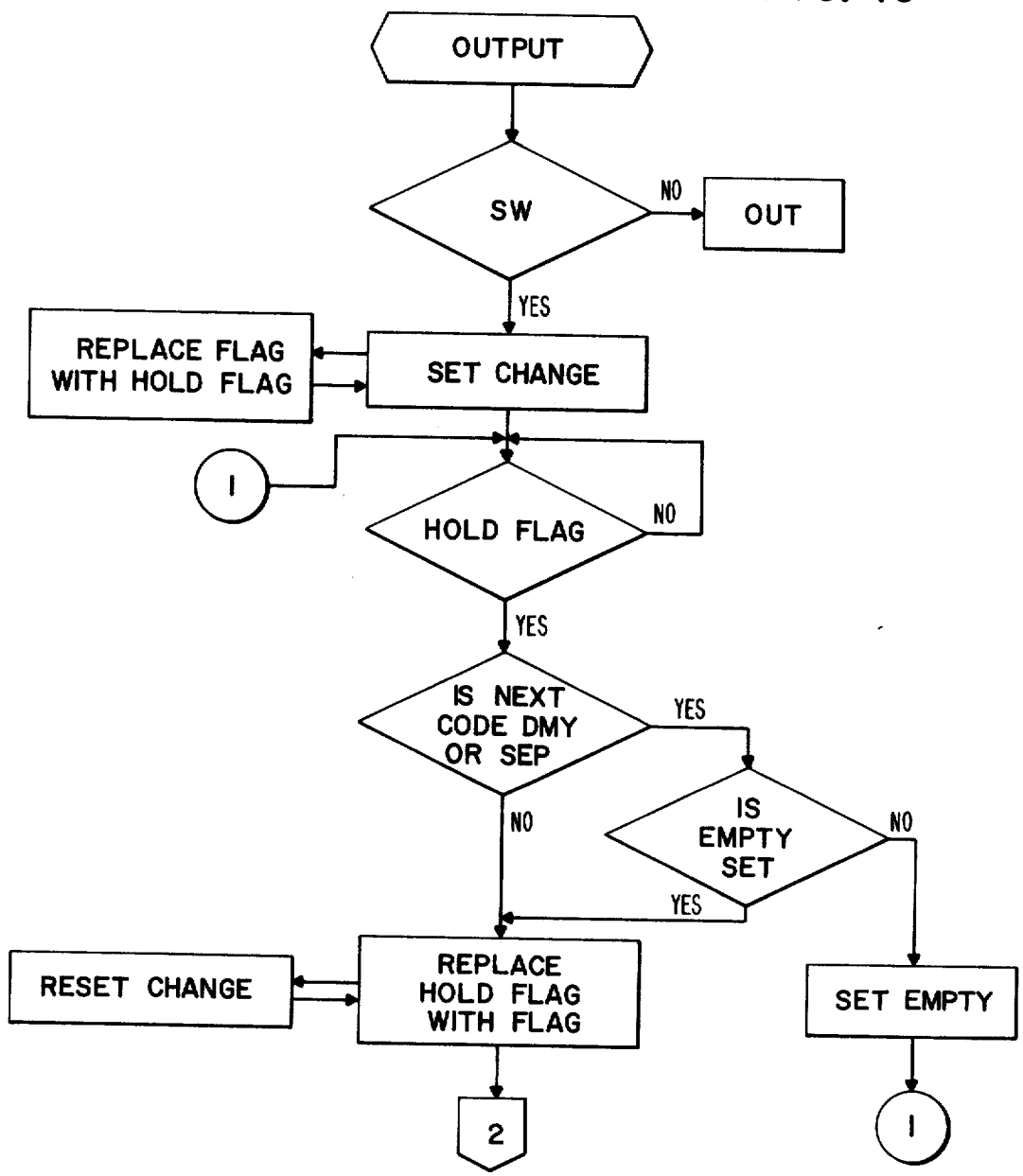
FIG. 10 is a flow chart illustrating the exchanging of positions of the operation and hold flags in the sections of the buffer when switch codes are encountered.

For simplicity of description reference is again made to FIG. 2. For a replace operation for exchanging the positions of the hold and operation flags when a switch code is detected, assume that the data flow in the shift register is as shown in FIG. 7 and a switch code has been encountered at the position of the operation flag. The data flow would be (DUMMY) (RECORD) (x) (x) (x) (x) (OPERATION) (SW) (x) (x) (x) (SEPARATOR) (x) (x) (x) (x) (HOLD) (x) (x) (x) (DUMMY). Upon detecting the switch code following the operation flag, the first task is to replace the operation flag with another hold flag. The switch code in the A register is set into the B register along the $\overline{BC}$ path. The opertion flag is held in the N register during this same period for inhibiting paths $\overline{D}$ and $\overline{BC}$. During the subsequent period, the operation flag is replaced by a hold flag by gating a hold flag from the data buss to the B register along path BC and again inhibiting path $\overline{BC}$. At the same time, the position of the operation flag in the N register is taken by the code previously contained in the A register. This operation is illustrated in the flow diagram in FIG. 10 and in the logic and timing diagrams of FIGS. 18 and 19 to be described in more detail hereinafter. Referring briefly to FIG. 10, when the operation flag is set into the N register, printout will continue until a switch code is set into the A register. A change latch is then set, the operation flag which has been set into the N register is held in the N register, and the switch code is set into the B register. Thereafter, a hold flag is set into the B register.

As is obvious from the above, upon the detection of a switch code, a second hold flag is inserted into the data flow following the switch code since the hold flag is the address of the next character upon detecting another switch code. The original hold flag is then replaced with a second operation flag and printout continues from that point.

From the above discussion, the operation flag could have been deleted by a delete operation before the insertion of the hold flag into the output register B. For the data flow "(x) (x) (SW) (x1) (x2) (x3) (SEPARATOR)" after deletion, to provide "(x) (x) (SW) (HOLD) (x1) (x2) (x3) (SEPARATOR)" after insertion, when the switch code is decoded it is set along path $\overline{D}$ into the N register. At the next falling edge of $\phi_2$, the switch code is then applied along path $\overline{BC}$ into the B register. At the same time the (x1), which followed the switch code into the A register, is set along path $\overline{D}$ into the N register. On the next cycle the switch code is fed into the first stage of the shift register; the (x1) is moved from the N register into the I register; the (x2) which is then in the A register is applied along path $\overline{D}$ into the N register; and the data buss applies the hold flag to be inserted along path BC into the B register. During the next memory cycle the (x1) is moved from the I register along the path $\overline{BC}$ into the B register; the (x2) is moved from the N register into the I register; the data input from the data buss is moved from the B register into the shift register and the (x3) which has been in the A register is applied along the path $\overline{D}$ into the N register. During the next cycle the (x1) is moved from the B register into the input stage of the shift register; the (x2) is moved from I register along paths $\overline{BC}$ into the B register and (x3) is moved from the N register into the I register. During the next memory cycle the (x2) is moved from the B register into the input stage of the shift register, the (x1) and hold flag are shifted one stage in the shift register and the (x3) is moved from the I register into the B register along the $\overline{BC}$ path. Then in the final cycle the (x3) is moved from the B register into the shift register, thus effectively inserting the hold flag into the data flow. This is illustrated in parts of the flow charts of FIGS. 9, 10, 12, and 13 wherein it is shown that when the insert mode, for exchanging hold and operation flag positions, or for forcing or writing over these flags, is entered into and the data buss has data to be inserted, if the next character is detected, the insert register is put into the data path thereby providing an expand register for inserting the data. The insertion of data then continues until a dummy code is detected at the output of the shift register which indicates that the insert operation is completed and a normal memory cycle is then entered into.

Figure 5:
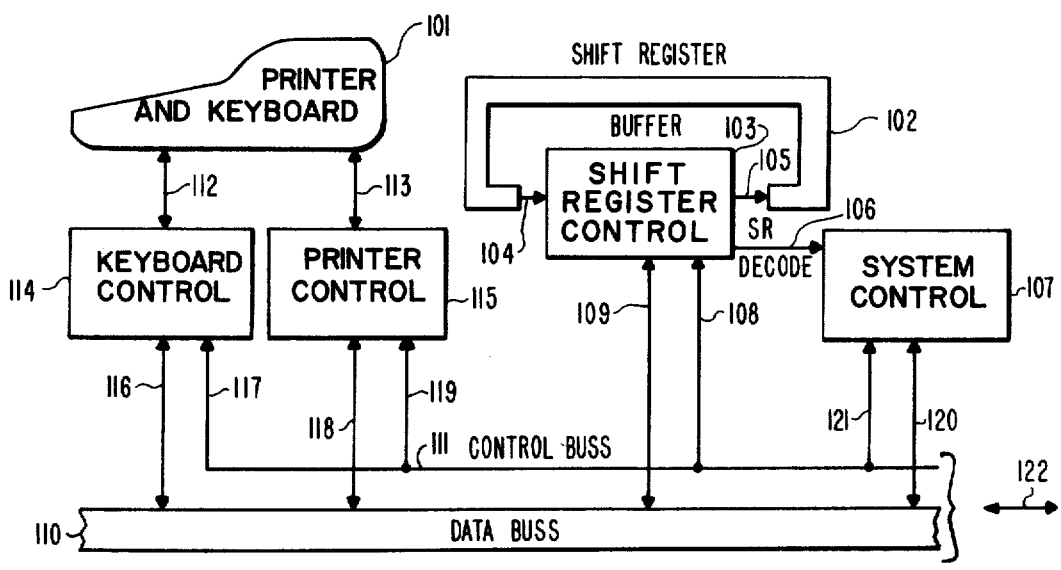
FIG. 5 is an overall block diagram illustrating the various control circuits utilized along with a typewriter buffer.

For a more detailed description of the overall system, reference is made to FIG. 5 wherein there is shown a printer or typewriter 101 in communication with a buffer 102. Buffer 102 is an electronic dynamic shift register, and is controlled by the control logic, or shift register control 103, which receives the output from the output stage of buffer 102 along line 104 and provides an input to the input stage of buffer 102 along line 105.

The printer and keyboard 101 is in two way communication with the keyboard control unit 114 along line 112 and with printer control unit 115 and line 113. Keyboard control 114 and printer control 115 are also in two way communication with the data buss 110 along lines 116 and 118, respectively. Data buss 110 is also in two way communication with the shift register control 103 along line 109 and the system control logic 107 along line 120, and the data buss 110 can communicate with an I/O device, such as a record reader, as indicated by arrows 122. The control buss 111 is in two way communication with keyboard control unit 114 along line 117, printer control unit 115 along line 119, shift register control logic 103 along line 108, and system control logic 107 along line 121. System control logic 107 receives decoded data from shift register control 103 along line 106.

Figure 6:
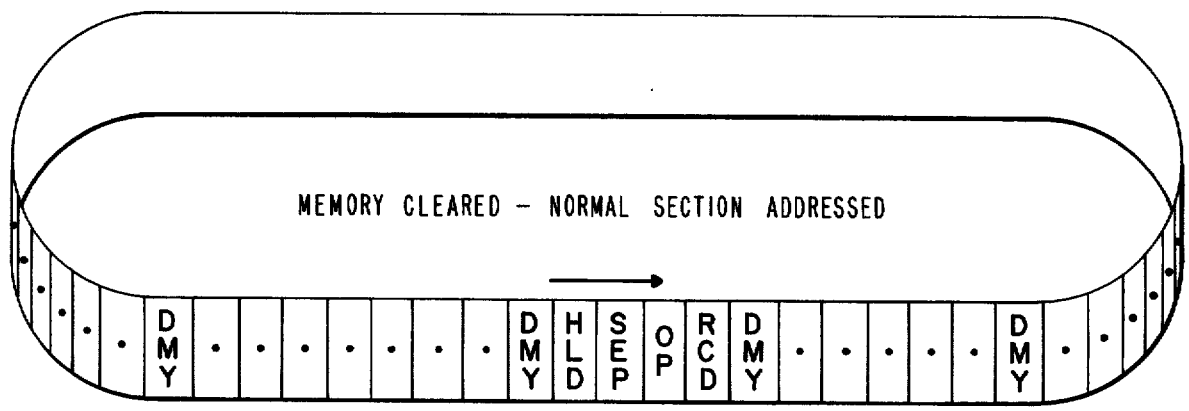
FIG. 6 is a drawing illustrating the relative location of the record, operation, separator and hold flags and the two sections of the buffer formed by the separator flag.
Figure 8:
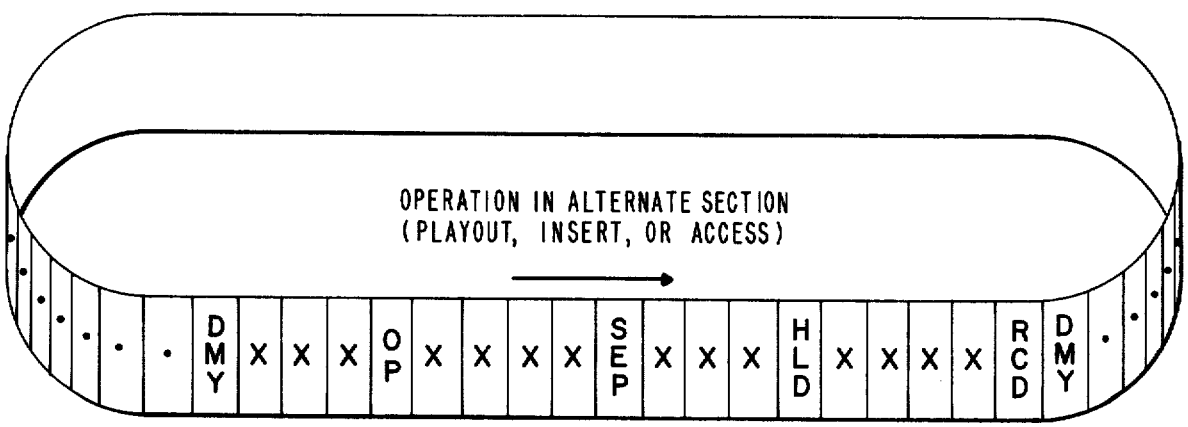
FIG. 8 is a drawing illustrating the operation in the other section of the buffer and the positions of the operation and hold flags relative to the data.

Referring now to FIG. 6, with the memory setup as shown and the normal, or first, section being addressed, the data flow is in the direction of the arrow. In this figure there are no character or switch codes in the memory and the memory is considered cleared. In FIG. 7, switch codes and character codes denoted by X have been input to the sections of the buffer defined by the separator code. Here operation is still in the first section since for purposes of definition the first section is to the right of the separator code and this is the position of the operation flag. In FIG. 8 the position of the operation flag is to the left of the separator flag, and therefore, operation is in the second or alternate section.

Figure 9:
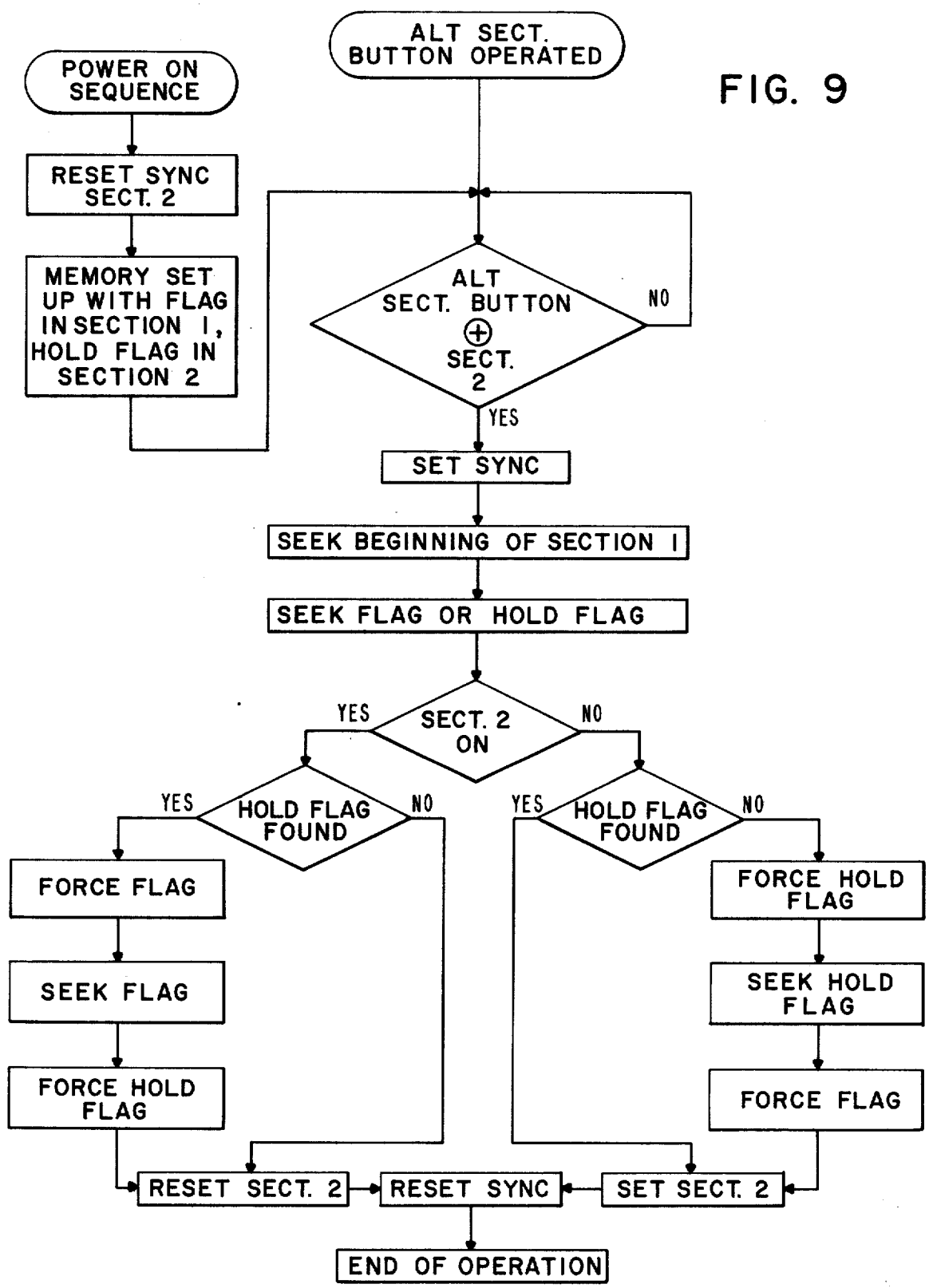
FIG. 9 is a flow chart illustrating the selection of the desired section in the buffer for beginning of storage or printout.

Referring to FIG. 9, there is depicted an operation for organizing the memory to match the position of the alternate section button. During the power on sequence, a second latch is reset (and a first latch is set) in the control logic for syncing on, or addressing, the first section and the memory is set up with the operation flag in the first section and the hold flag in the second section. If the alternate section button were down for syncing on, or addressing, the second section, the memory is scanned for the beginning of the first section and an operation flag or a hold flag. Since the first latch was set for addressing the first section, and since the section latch was reset (Sect. 2 is not on), if a hold flag is found in the first section during the scan of the memory, the operation is as shown in the right leg of the flow diagram. That is, the second latch is set to address the second section and the first latch is reset. If a hold flag were not found in the first section during a scan of the memory then the old and operation flags are exchanged, the second latch is set, and the first latch is reset. Therefore, the addressed section of the memory is synced with the position of the alternate section button.

Assuming the alternate section button were down initially, if after setup of memory the operator changed the position of the alternate section button to address the first section, the memory is scanned for the beginning of the first section and a hold flag or operation flag. Since the second latch is set (Sect. 2 is on), the operation is as shown in the left leg of the flow diagram, and if a hold flag is found, it is exchanged with an operation flag and the second latch is reset and the first latch is set. If a hold flag were not found, the second latch would be reset and the first latch is set. In other words, the operation and hold flags are exchanged to match the position of the button, and in effect either section can be the first section.

From the above description it can be seen that a very versatile and simple system has been provided for exchanging the positions of the hold and operation flags in the sections and for addressing the desired section. This function can be performed through simple manipulation of the logical lines A, B, C, and D along with the decoding of the required flags and switch codes.

Figure 15:
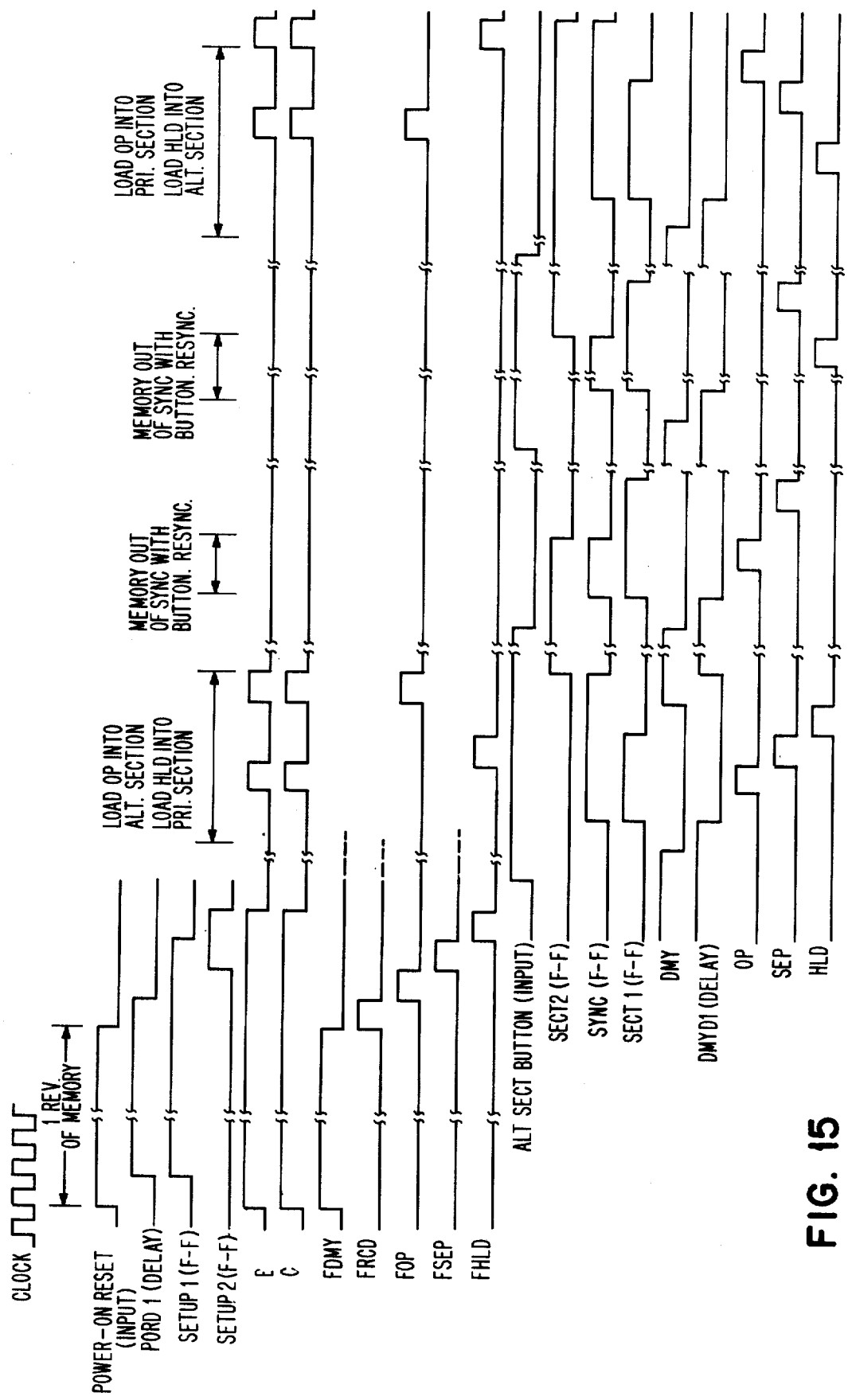

Referring now to FIG. 14, a preferred embodiment is shown of a logical implementation of the set-up operation described above and depicted by the flow diagram of FIG. 9. Reference is also made to FIG. 15 which shows the timing sequence of the operations of the logical elements of FIG. 14. When power is applied to the system, a positive power-on reset (POR) signal is applied for a period of time that equals or exceeds one revolution of the dynamic shift register buffer. The POR signal is applied to AND gate 153 which generates a positive FDMY output signal to drive dummy code inserter 154 to gate a succession of dummy codes onto data buss 49. The FDMY signal is also gated through OR gates 179 and 180 to drive control lines B and C (FIG. 4) of the shift register control logic. With lines B and C driven positive, the dummy codes gated onto the data buss by dummy code inserter 154 are successively input into the dynamic shift register buffer through output register B (FIG. 4).

FIG. 14a shows a circuit that may be used for code inserter 154 as well as for the other code inserters to be described hereinafter. In FIG. 14a, code generator 183 of code inserter 182 may be an n bit register loaded with an n bit code corresponding to the desired code to be inserted. Alternatively, code generator 183 may simply include a voltage source connected to individual bit lines that have a positive or "1" value corresponding to the "1's" digits in the code sequence of the code to be inserted, with the lines having a "zero" value being grounded. AND gate 184 is representative of a plurality of n AND gates, one for each bit line, through which the bits of the code are gated onto the data buss by application of an external signal to an input of the AND gates.

During the POR signal, therefore, every storage location of the dynamic shift register buffer 102 (FIG. 5) is loaded with a dummy code. The POR signal is also gated through OR gate 136 to reset flip-flop 137, is gated through OR gate 172 to reset flip-flop 169, and is gated through OR gate 174 to reset flip-flop 176. The POR signal is also applied to the set input of flip-flop 134. During the bit time immediately succeeding the termination of the POR signal, a positive PORD1 signal is produced at the Q output of delay circuit 130 and is applied to an input of AND gate 131. During this bit time a positive signal is also produced at the output of inverter 132 which enables the other input of AND gate 131. The FRCD output signal of AND gate 131 is gated through OR gates 179 and 180 to drive control lines B and C, respectively. Simultaneously, the FRCD signal enables record flag inserter 133 to gate a record flag onto the data buss. With control lines B and C being driven, the record flag is inserted into the dynamic shift register buffer 102 through output register B.

At the following bit time PORD1 is no longer positive, but a positive $\overline{PORD1}$ signal is generated at the $\overline{Q}$ output of delay circuit 130 and is applied to an input of AND gate 138. Flip-flop 137 was reset by the POR signal so that a positive SETUP2 signal appears at the $\overline{Q}$ output thereof, enabling another input of AND gate 138. Flip-flop 134 was set by the POR signal so that a positive SETUP1 signal is present at the Q output thereof, enabling the third input of AND gate 138. The positive output of AND gate 138 is gated through OR gate 139 to generate a positive FOP signal that is gated through OR gates 179 and 180 to drive control lines B and C of the shift register control logic. The FOP signal enables operation flag inserter 140 to gate an operation flag onto the data buss to be inserted into the code stream in the buffer immediately following the record flag code. The positive $\overline{PORD1}$ and SETUP1 signals applied to AND gate 135 enable a positive signal to the set input of flip-flop 137 during this bit time.

At the next bit time, flip-flop 137 is set, providing a positive SETUP2 signal at the Q output thereof. The positive SETUP1 and SETUP2 signals enable AND gate 145 to generate a positive FSEP signal thereby enabling separator code inserter 146 to gate a separator code onto data buss 49. Simultaneously, the positive FSEP signal is gated through OR gates 179 and 180 to drive control lines B and C, thereby allowing the separator code to be inserted into the data stream immediately succeeding the operation flag. During this bit time the positive SETUP2 signal is applied to the reset input of flip-flop 134.

At the following bit time, flip-flop 134 becomes reset, thereby providing a positive $\overline{SETUP1}$ signal at the $\overline{Q}$ output thereof. The positive SETUP2 and $\overline{SETUP1}$ signals are applied to AND gate 147 to enable a positive output signal at AND gate 147 which is gated through OR gate 148 to provide a positive FHLD signal. The positive FHLD signal enables hold flag inserter 149 to gate a hold flag onto data buss 49 while, simultaneously, the FHLD signal is gated through OR gates 179 to 180 to drive control lines B and C. This enables the insertion of a hold flag code into the data stream immediately following the separator code. The positive $\overline{SETUP1}$ signal is gated through OR gate 136 to the reset input of flip-flop 137 during this bit time to reset flip-flop 137 at the beginning of the next bit time.

As this time, memory organization is as shown in FIG. 6. The timing sequence of the above-described operations is as shown in the left-hand portion of FIG. 15.

When the alternate section button is depressed and latched down to address the alternate section of the memory, a positive ALT SECT BTN signal is generated. A positive $\overline{ALT\ SECT\ BTN}$ signal is generated when the alternate section button is latched in the up position to address the primary, or first, section of the memory. As will be explained in detail hereinafter, the operation of addressing either the first or the second section of the memory may be accomplished by operator movement of the alternate section button, or automatically, in response to switch codes appropriately interspersed in the text stored in the two sections of the memory.

Assume now that the initial set-up operation has occurred as explained above. Thus, the primary section of the memory is being addressed because the operation flag is situated between the record flag and the separator code, and the hold flag is presently situated in the alternate section between the separator code and the dummy codes. Assume now that the operator desires to address the alternate section, rather than the primary section of the buffer. The operator depresses and latches down the alternate section button which generates a positive ALT SECT BTN signal. Referring to FIG. 14, AND gates 156, 162, 164, and 165 are connected to decode dummy codes, the operation flage, the separator code, and the hold flag, respectively. During each memory revolution, at the bit time following the last of the sequence of dummy codes a positive $\overline{DMY}$ signal is generated at the output of inverter 157, thereby enabling one of the two inputs of AND gate 158. During this bit time, a positive DMYD1 signal is also generated at the output of delay circuit 160 to enable the other input of AND gate 158, thereby causing this AND gate to generate a positive SS1 signal to the set input of flip-flop 159. During this bit time the positive SS1 signal, as well as the positive ALT SECT BTN signal are applied to AND gate 167. The $\overline{\text{SECT2}}$ signal, applied to the remaining input of AND gate 167, is also positive because flip-flop 176 has remained reset since the power-on reset. Thus, the positive output of AND gate 167 is gated through OR circuit 168 to set flip-flop 169.

Flip-flop 159 is in a set condition during the time that data codes are being decoded in the first, or primary, section of the memory. Flip-flops 169 and 176 are included in synchronizing logic that is operated once for each change in state of the alternate section button to assure that the section of memory being addressed is as indicated by the button after operation of the button.

In the example above, with the alternate section button latched down, a positive SYNC signal is generated by flip-flop 169. In the next succeeding memory revolution, during the decoding of codes in the first, or primary, section of the memory a positive OPD1 signal is generated by delay circuit 163 at the bit time following the decoding of the operation flag by AND gate 162. At this time all inputs of AND gate 151 become positive, thereby generating a positive signal at the output of AND gate 151 which is gated through OR gate 148 to produce a positive FHLD signal. The FHLD signal drives hold flag inserter 149 to force a hold flag onto data buss 49. At the same time the FHLD signal is gated through OR gates 179 and 180 to drive control lines B and C, thereby replacing the operation flag in the first section of the memory with a hold flag.

As this memory revolution proceeds, the separator code is decoded by AND gate 164 to generate a positive SEP signal that is applied to the reset input of flip-flop 159 to provide a positive $\overline{\text{SECT1}}$ signal at the $\overline{Q}$ output thereof at the next bit time. A positive HLD signal is generated by AND gate 165 when the hold flag in the alternate section is beind decoded. Delay circuit 166 generates a positive HLDD1 signal at the next bit time thereafter which enables an input of AND gate 144. The other inputs of AND gate 144 are positive to provide a positive RST1 output signal at AND gate 144. The positive RST1 signal is gated through OR gate 139 to generate a positive FOP signal which enables the replacement of the hold flag in the alternate section with an operation flag generated by operation flag inserter 140. The RST1 signal is also gated through OR circuit 171 to produce a positive RST signal that is applied to an input of AND gate 175. The positive $\overline{\text{SECT2}}$ signal is applied to the other input of AND gate 175, thereby enabling AND gate 175 to generate a positive output signal that is applied to the set input of flip-flop 176. At the next bit time thereafter, a positive SECT2 signal is provided at the Q output of flip-flop 176.

Before the operator's depression of the alternate section button, the operation flag was located in the primary section while the hold flag was located in the alternate section of the dynamic shift register buffer. After latching down the alternate section button, the flag locations were reversed, with a hold flag being written over the operation flag in the primary section and an operation flag being written over the hold flag in the alternate section. Thus, the memory is now organized for addressing the alternate section. Flip-flop 176 remains set until the state of the alternate section button is again changed. The previously generated positive RST signal was gated through OR circuit 172 to reset flip-flop 169. As a result of the set condition of flip-flop 176, the $\overline{\text{SECT2}}$ signal is no longer positive and, therefore, flip-flop 169 cannot be set on subsequent memory revolutions while the alternate section button remains latched down.

Assume now that in the time during which the alternate section button remains latched down, an automatic switching operation takes place (to be described hereinafter) resulting in the hold flag in the primary section of the memory being replaced by an operation flag and the operation flag in the alternate section of the memory being replaced by a hold flag. Assume, further, that the operator subsequently releases the alternate section button such that the button position now conforms to the section of memory (primary) presently being addressed. When a positive SS1 signal appears, AND circuit 170 generates an output by virtue of the $\overline{\text{ALT SECT BTN}}$ and SECT2 signals, applied to the other inputs thereof, being positive. The output of AND gate 170 is gated through OR circuit 168 to set flip-flop 169. During this memory revolution, however, none of the AND gates 143, 144, 151, nor 152 produce an output signal to effect flag changing operations in the memory, because at no time are all of the input conditions of any one of these AND gates satisfied. When the operation flag is decoded in the primary section of the memory, AND gate 177 produces a positive output that is gated through OR gate 171 to generate the RST signal. Because flip-flop 176 is set, a positive SECT2 signal is applied to one of the inputs of AND gate 173. The RST signal is applied to the other input of AND gate 173 to generate an output from this AND gate which is gated through OR gate 174 and applied to the rest input of flip-flop 176. The positive RST signal is also gated through OR gate 172 for application to the reset input of flip-flop 169. At the next bit time flip-flop 169 and 176 become reset and, as long as the alternate section button remains released, flip-flop 169 is inhibited from becoming set because of the positive $\overline{\text{ALT SECT}}$ and SECT2 signal combination.

Assume now that another automatic switching operation (to be described hereinafter) has taken place in the memory resulting in the location of the hold flag in the primary section of the memory and the operation flag in the alternate section of the memory. Assume further, that after this automatic switching operation has taken place the operator depresses and latches down the alternate section button. After latching down the alternate section button a positive ALT SECT BTN signal is applied to AND gate 167. Flip-flop 176 remains reset so that a positive $\overline{\text{SECT2}}$ signal is also applied to AND gate 167. When the positive SS1 signal is generated flip-flop 167 produces an output that is gated through OR gate 168 to the set input of flip-flop 169. Again, however, because the button position now conforms with the section of memory being addressed, none of the AND gates 143, 144, 151, nor 152 generate an output during this memory revolution, since the input conditions of none of these AND gates are simultaneously positive. Thus, no flag switching occurs in the memory. Upon decoding the hold flag in the primary section, all inputs to AND gate 178 become positive and the output signal of this AND gate is gated through OR gate 171 to generate the RST signal. The RST signal now sets flip-flop 176 through AND gate 175 and resets flip-flop 169 through OR gate 172. Thus, in this operation, and in the operation described immediately above, when the alternate section button is moved by the operator to conform to the section of memory presently being addressed, the logic is inhibited from further relocation of the operation and hold flags.

Assume now that the operator releases the alternate section button, although no automatic switching of the flags has occurred. That is, immediately prior to release of the alternate section button the hold flag was located in the primary section of the memory and the operation flag was located in the alternate section to address the alternate section of the memory. Because flip-flop 176 was set before releasing the alternate section button, upon the occurrence of the positive SS1 signal after release of the button, AND gate 170 generates an output signal that is gated through flip-flop 168 to the set input of flip-flop 169. As the shift register data continues to circulate through the primary section, all inputs of AND gate 143 are positive at one bit time after decoding the hold flag in the primary section of the memory. The positive output signal of AND gate 143 is gated through OR gate 139 to generate the positive FOP signal which enables operation flag inserter 140 to gate an operation flag onto data buss 49. Simultaneously, the positive FOP signal is gated through OR gates 179 and 180 to activate control lines B and C, thereby allowing the operation flag to be inserted into the data stream to replace the hold flag. As the data in the shift register continues to circulate, all of the input conditions of AND gate 152 are satisified at one bit time after the decoding of the operation flag in the alternate section of the memory. When the output of AND gate 152 becomes positive the RST2 signal is generated and is gated through OR gate 148 to provide the positive FHLD signal. The FHLD signal enables hold flag inserter 149 to gate a hold flag onto the data buss and simultaneously activates control lines B and C through OR gates 179 and 180. Thus, the operation flag code in the alternate section of the memory is now replaced by a hold flag. The positive RST2 signal is also gated through OR gate 171 to generate a positive RST signal that is applied to an input of AND gate 173. The other input of AND gate 173 is positive because flip-flop 176 is set. The output signal of AND gate 173 is gated through OR gate 174 to the reset input of flip-flop 176 to reset this flip-flop at the next bit time. The RST signal is also gated through OR gate 172 to reset flip-flop 169 at the next bit time.

Thus, it will be realized that the logic shown in FIG. 14 causes switching of the memory section being addressed when, after a change in state of the alternate section button, the memory section indicated by the alternate section button disagrees with the section being addressed just prior to the change in state of the button. However, when a change in state of the alternate section button causes the button indication to agree with the section of memory being addressed just prior to the change in state of the button, no switching of the section being addressed occurs. The right-hand portion of the timing diagram of FIG. 15 depicts the logical operations for the four examples of alternate section button operation described above.

Figure 11:
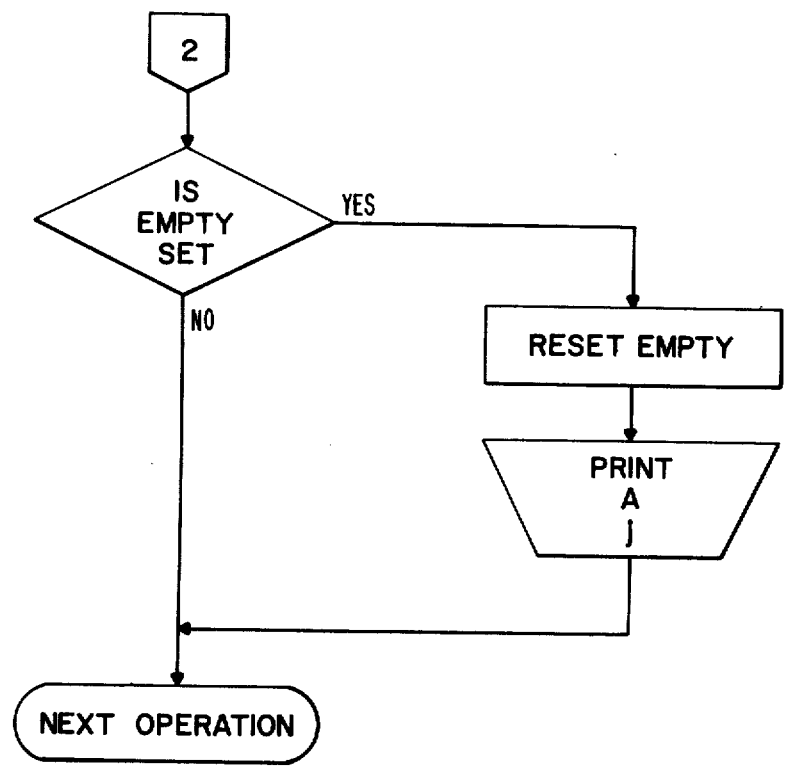
FIG. 11 is a flow chart illustrating the remainder of those operations illustrated in FIG. 10.

Now referring again to FIG. 10, during an output operation when data is to be printed out, this will continue from the section being addressed until a switch code is detected, whereupon a change latch for initiating a changing operation is set and the operation flag is replaced by a second hold flag. Then the original hold flag and the next character thereafter are addressed. If the next character is a dummy or a separator and an empty latch has not been set indicating that the remainder of the section is empty (does not contain additional text data codes), it is then set and the second hold flag and next code are again addressed. Even if the next code is a dummy or separator, since the empty latch has been set, the second hold flag is replaced with the operation flag and the change latch is reset. Referring now to FIG. 11, the determination is again made as to whether the empty latch is set. If not, the operation continues as will be described hereinafter. If the empty latch is set, the empty latch is reset, and a "*f*" or other suitable character is printed, providing the operator with an indication that the output operation has ended and/or new data, such as additional addresses, are required for continued printout.

Figure 19:
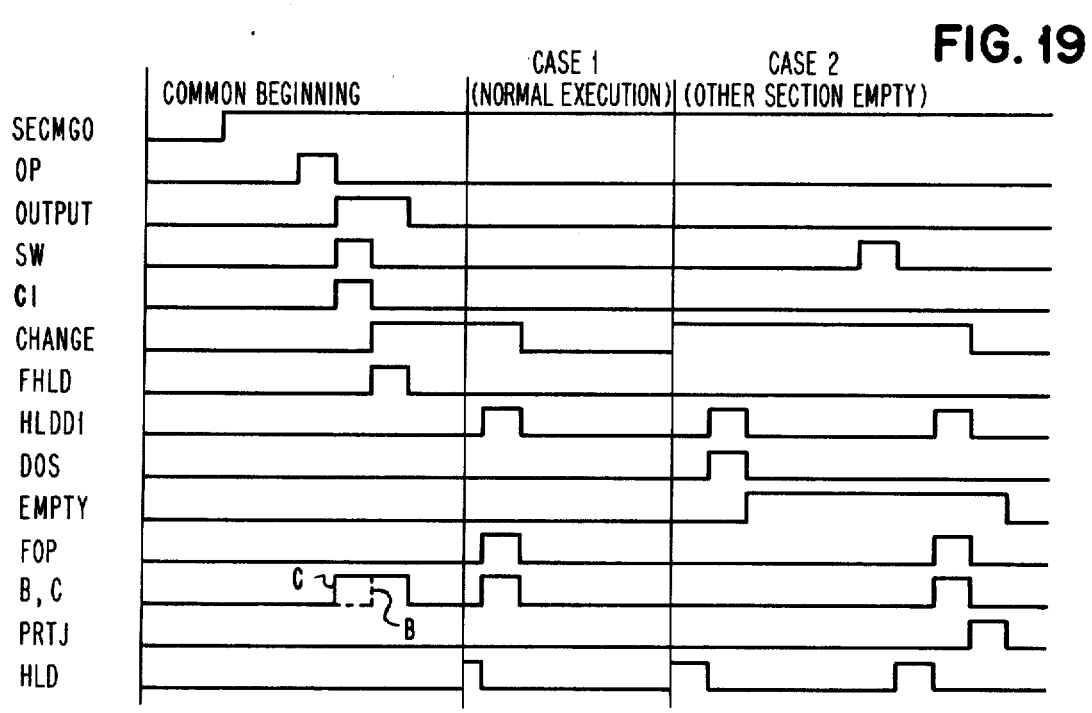
Figure 18:
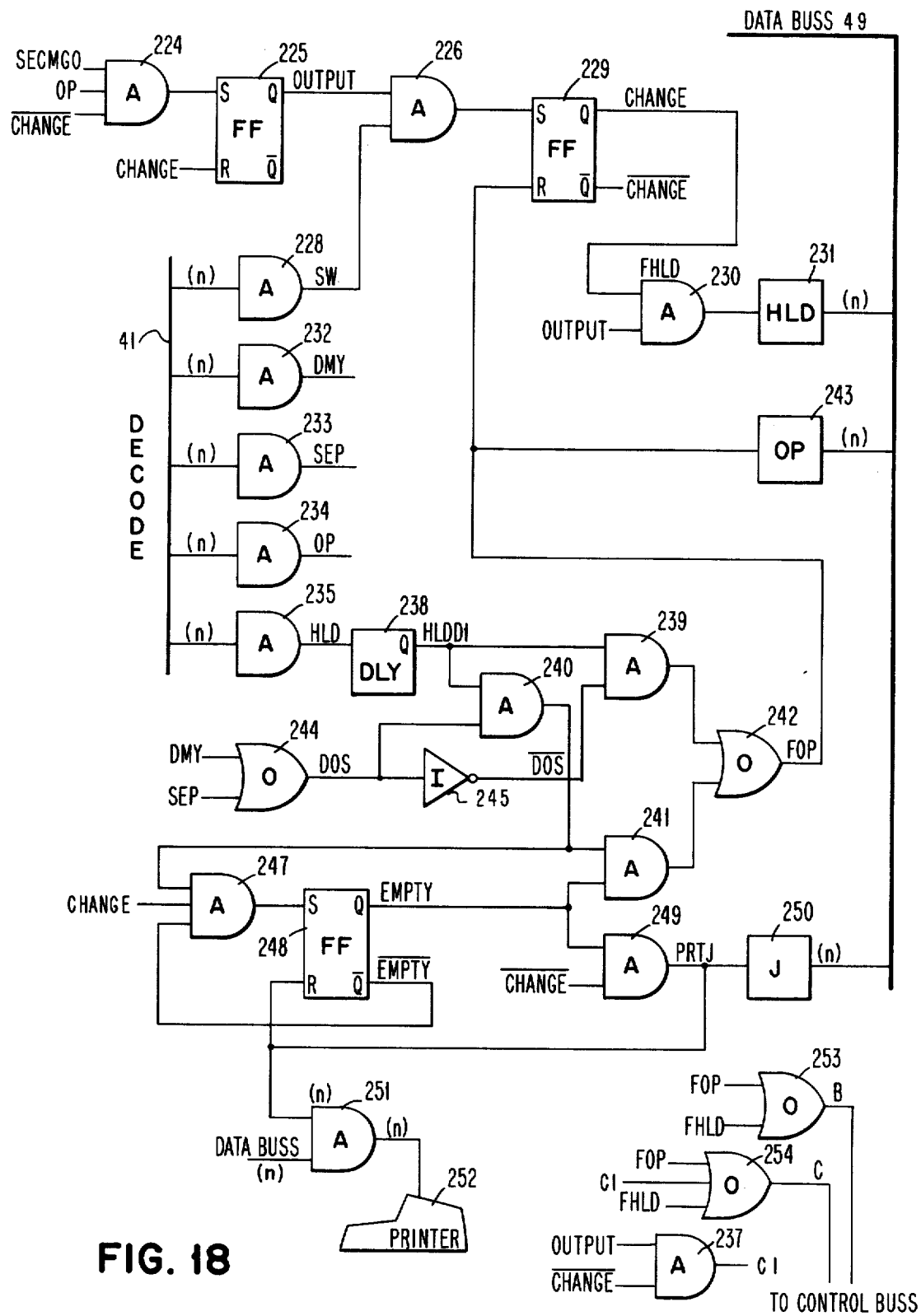

Referring now to FIGS. 18 and 19, a logic diagram and a timing diagram show a logical implementation of the operation described above and depicted by the flow diagram of FIGS. 10 and 11 for automatically switching the section of the memory being addressed in response to switch codes that are interspersed in the stream of textual data stored in the dynamic shift register. Operator depression of any of a number of switches to cause playout generates a positive SECMGO signal that is applied to an input of AND gate 224. Assuming that all flip-flops in FIG. 18 are initially reset, a positive $\overline{\text{CHANGE}}$ signal from the $\overline{Q}$ output of flip-flop 229 is applied to another input of AND gate 224. When the operation flag is decoded by AND gate 234 the third input of AND gate 224 is positive, providing an output signal at AND gate 224 that is applied to the set input of flip-flop 225. At the next bit time a positive OUTPUT signal is produced at the Q output of flip-flop 225 and is applied to an input of AND gate 226. The positive $\overline{\text{CHANGE}}$ and OUTPUT signals are applied to AND gate 237 to provide a positive C1 output signal therefrom that is gated through OR gate 254 to drive control line C. Assuming that the code following the operation flag is a switch code, at the same bit time that the positive OUTPUT signal appears, a positive SW signal appears at the output of AND gate 228. The resultant positive output of AND gate 226 is applied to the set input of flip-flop 229. At the following bit time flip-flop 229 becomes set to produce a positive CHANGE signal at the Q output thereof. During this time the positive OUTPUT signal is applied to an input of AND gate 230, because flip-flop 225 is set. When the positive CHANGE signal appears, the other input of AND gate 230 is enabled, thereby allowing AND gate 230 to generate a positive FHLD signal that is applied to hold flag inserter 231 to force a hold flag onto data buss 49. The positive FHLD signal is also gated through OR gates 253 and 254 to activate control lines B and C, thereby enabling the hold flag to be inserted into the data stream to replace the operation flag. However, because control line C was driven prior to the hold flag insertion, the switch code is allowed the precede, rather than succeed the new hold flag.

As the data continues to circulate in the memory, AND gate 235 produces a positive HLD output and the next decoding of a hold flag. The hold flag next decoded is the original hold flag and not the hold flag just inserted. A positive HLDD1 signal is generated by delay circuit 238 during the bit time following the decoding of the hold flag by AND gate 235. If a dummy code is decoded by AND gate 232 during the bit time after the (original) hold flag is decoded, then the (original) hold flag is located at the very end of the alternate section of the memory. If the separator code is decoded by AND gate 233 immediately following the (original) hold flag, then the (original) hold flag is at the very end of the primary section of the memory. If neither of these cases is true, the (original) hold flag is replaced by an operation flag and playout is allowed to continue. Thus, if neither a positive dummy code nor a separator code signal is applied to OR gate 244, a positive $\overline{\text{DOS}}$ signal is generated by inverter 245 and is applied to an input of AND gate 239. The positive HLDD1 signal enables the other input of AND gate 239 and the positive output of this AND gate is gated through OR gate 242 to generate the FOP signal. The FOP signal activates operation flag inserter 243 to force an operation flag onto the data buss while, simultaneously, the positive FOP signal is gated through OR gates 253 and 254 to activate control lines B and C to effect replacement of the (original) hold flag with an operation flag. The positive FOP signal is also applied to the reset input of flip-flop 229 to reset this flip-flop at the next bit time.

If, however, the (original) hold flag is at the end of a memory section, the DOS signal output of OR gate 244 and the positive HLDD1 signal enable AND gate 240 to provide a positive output signal that is applied to an input of AND gate 247. The positive CHANGE signal is applied to another input of AND gate 247 and, since flip-flop 248 has remained reset, the positive $\overline{\text{EMPTY}}$ signal is applied to the third input of AND gate 247. The positive output signal of AND gate 247 is applied to the set input of flip-fop 248 to set this flip-flop at the next bit time. As the data continues to circulate within the dynamic shift register, the (new) hold flag inserted during this operation will eventually be decoded by AND gate 235. At one bit time thereafter the positive HLDD1 signal generated by delay circuit 238 is applied to an input of AND circuit 239. If the code being decoded during this bit time is neither a dummy code nor a separator code, a positive $\overline{\text{DOS}}$ signal is generated by inverter 245 and applied to the other input of AND gate 239. The output of AND gate 239 is gated through OR gate 242 to generate the FOP signal for replacement of the (new) hold flag with an operation flag. Thus, in the event that the (original) hold flag was at the end of the section, although the switching operation was begun by replacing the (original) operation flag with a (new) hold flag, on the next memory revolution the memory is restored to address the originally addressed section by replacing the (new) hold flag with an operation flag. The positive FOP signal is also applied to the reset input of flip-flop 229 so that a positive $\overline{\text{CHANGE}}$ signal is generated at the next bit time thereafter.

At the bit time during which flip-flop 229 becomes reset to provide a positive $\overline{\text{CHANGE}}$ at the Q output thereof, AND gate 249 generates a positive PRTJ signal by virtue of the positive EMPTY and $\overline{\text{CHANGE}}$ input signals applied thereto. The PRTJ signal drives the J character inserter 250 to force the character "j" onto data buss 249. Simultaneously, the PRTJ signal enables AND gate 251 to gate the character "j" from the data buss to printer 252 for printing. The printing of the character "j" (or any other chosen character or symbol) indicates to the operator that all of the data has been output in the section of the memory to which an address switching operation was attempted. The character "j" is not inserted into the memory because control lines B and C are not activated at this time. The PRTJ signal is also applied to the reset input of flip-flop 248 to reset this flip-flop at the next bit time thereafter.

Assume now that at the bit time following the decoding of the (new) hold flag, AND gate 232 or 233 decoded a dummy code or a separator code. The positive DMY or SEP signal is gated through OR gate 244 to generate a positive DOS signal that is applied to an input of AND gate 240. During this bit time a positive HLDD1 signal is applied to the other input of AND gate 240 causing a positive output signal from AND gate 240 to be applied to AND gate 241. The positive EMPTY signal is applied to the other input of AND gate 241 resulting in an output from AND gate 241 that is gated through OR gate 242 to generate a positive FOP signal. The FOP signal enables operation flag inserter 243 and OR gates 253 and 254 to replace the (new) hold flag with an operation flag. The FOP signal is also applied to the reset input of flip-flop 229 so that a positive $\overline{\text{CHANGE}}$ signal is generated at the next bit time thereafter. Again, the (new) hold flag is replaced by an operation flag to restore the section of memory being addressed to the condition immediately preceding the decoding of the switch code. However, in this instance, both the operation flag and the hold flag are at the end of their sections of memory indicating that all of the data in the memory has been played out. As in the preceding example a "j" is printed to indicate to the operator that all codes have been output in the section to which a switching operation was attempted.

Figure 12:
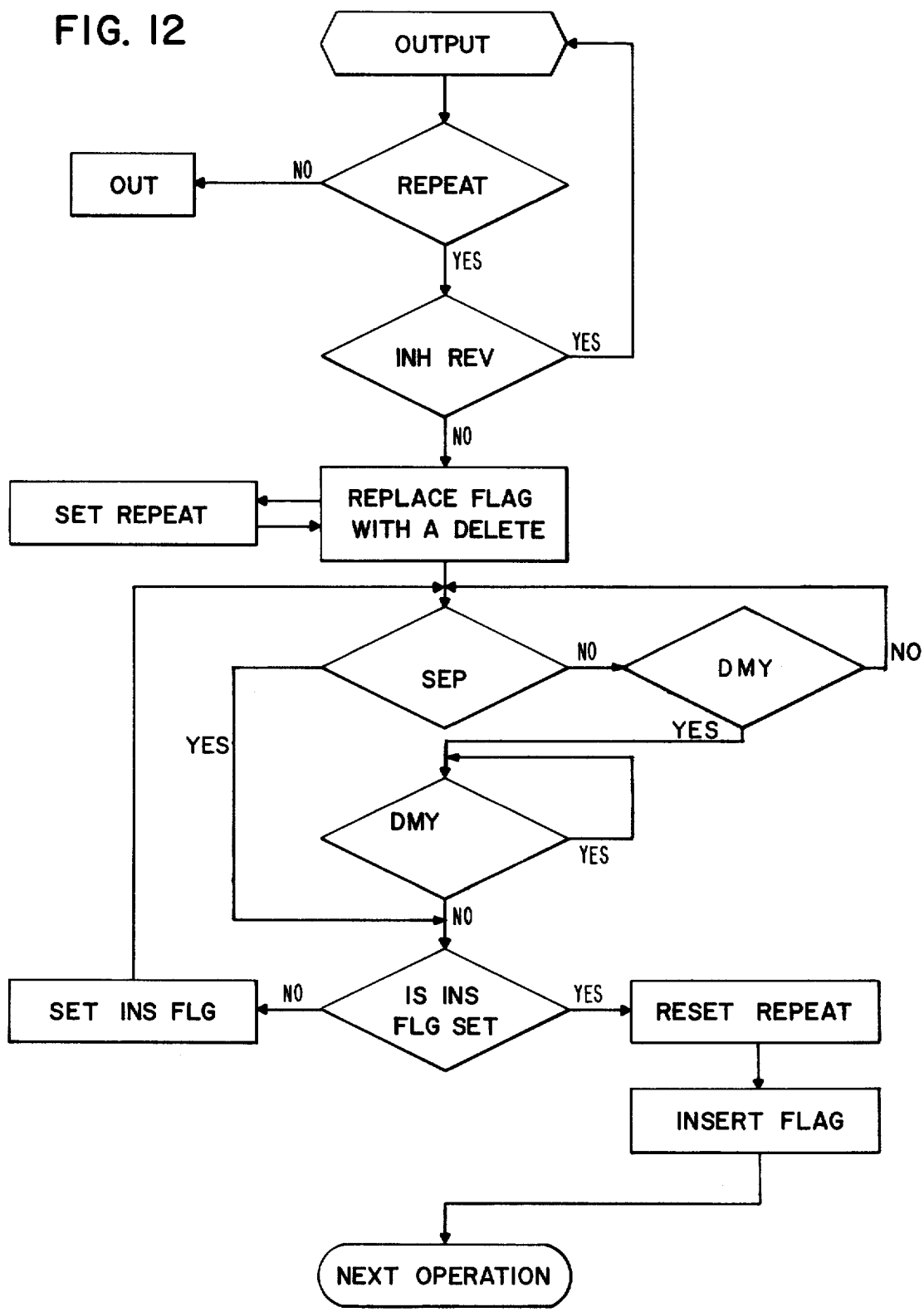
FIG. 12 is a flow chart illustrating a repeat operation for repeatedly causing printout of the same material contained in one section of the buffer.

Referring to FIG. 12, during an output operation if a repeat code has been encountered for repeating a set of data stored in one of the sections and the inhibit reverse bit is "up", then the operation loops, or waits, until the bit is "down". The inhibit reverse bit is a logical control signal which inhibits the repositioning of the operation flag at the beginning of the section. The bit could simply be a latch. When the bit is "down", then the operation flag is replaced with a delete code and a repeat latch is set. Thereafter, the next code in the data flow is analyzed to determine if it is either a dummy or a separator. If the next code is a separator, a latch is set for inserting an operation flag and the scanning operation continues. If the next code is a dummy, the scanning operation continues until a code other than a dummy is found and then at that time the latch is set for inserting an operation flag. With the latch being set, the repeat latch is reset, and scanning continues until the beginning of the section following the next section is detected. Then an operation flag is written into the memory, the latch for inserting the operation flag is reset, and printout continues.

Figure 16:
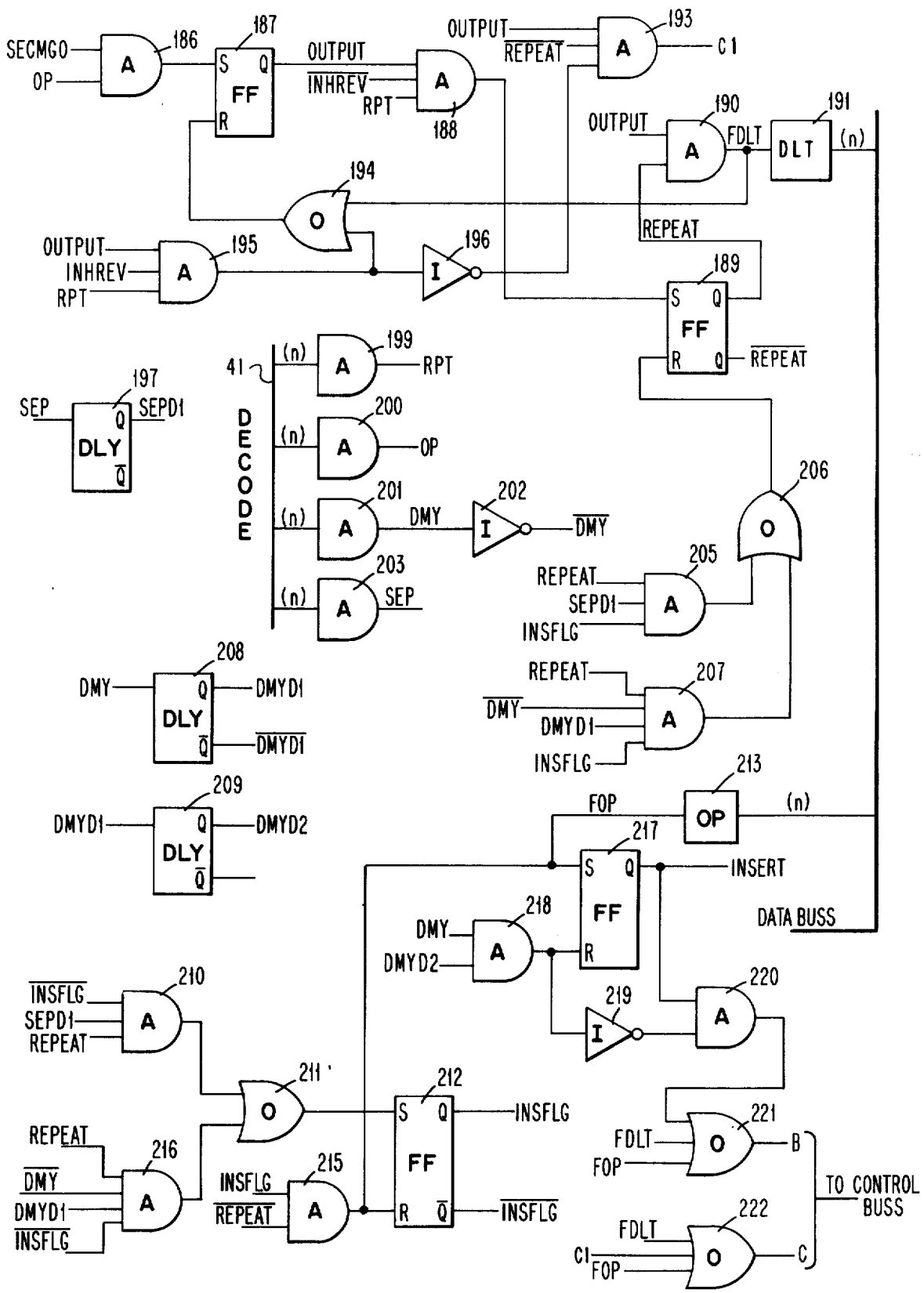
Figure 17:
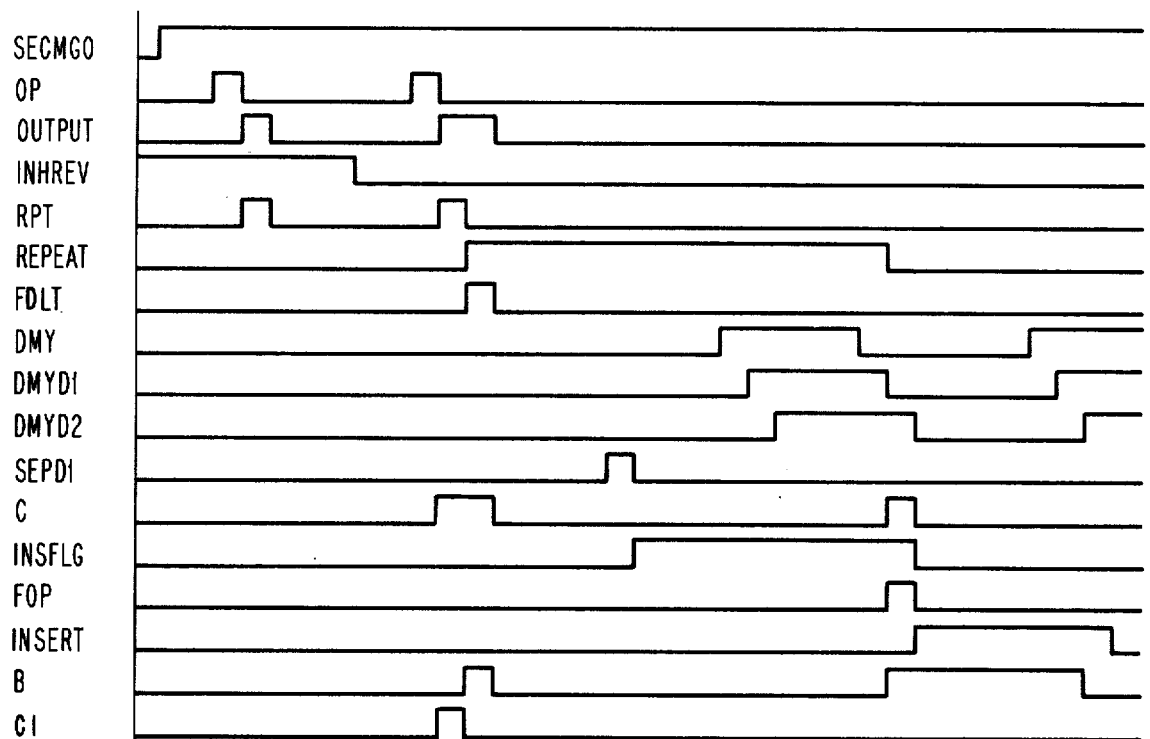

Referring now to FIGS. 16 and 17, the preferred embodiment is shown of a logical implementation of the repeat operation described above and depicted by the flow diagram of FIG. 12. A positive SECMGO signal is the enabling signal for an output operation, and is applied to an input of AND gate 186. When the operation flag is decoded by AND gate 200, the positive OP signal enables the other input of AND gate 186, thereby providing an output from this AND gate to the set input of flip-flop 187. A positive OUTPUT signal is provided at the Q output of flip-flop 187 one bit time after the decoding of the operation flag. Assume now that the $\overline{\text{INHREV}}$ signal is positive whenever a repeat operation would not conflict with the operation of the remainder of the system and that a positive INHREV signal is present when a repeat operation would present a conflict with the remainder of the system. It is presently assumed that the $\overline{\text{INHREV}}$ signal, applied to an input of AND gate 188, is positive.

Because the $\overline{\text{INHREV}}$ signal is positive, the INHREV signal is not positive so that no positive output signal is provided by AND gate 195. Thus, a positive output signal is provided by inverter 196 that is applied to an input of AND gate 193. The positive OUTPUT and $\overline{\text{REPEAT}}$ (flip-flop 189 has not been set) signals enable AND gate 193 to provide a positive C1 output signal that is gated through OR gate 222 to drive control line C. This will allow the repeat code to be shifted into a position immediately preceding the operation flag.

Assume now that the primary section of memory is being addressed. When a repeat code is decoded by AND gate 199, a positive RPT signal is generated thereby and is applied to the third input of AND gate 188 enabling this AND gate to generate a positive signal that is applied to the set input of flip-flop 189. Flip-flop 189 becomes set one bit time thereafter to generate a positive REPEAT signal at the Q output thereof which is applied to an input of AND gate 190. Since the OUTPUT signal remains positive, AND gate 190 produces a positive FDLT signal that drives delete code inserter 191 to force a delete ccode onto the data buss 49. Simultaneously, the positive FDLT signal is gated through OR gates 221 and 222 to drive control lines B and C. This allows the delete code to be inserted into the data stream immediately succeeding the repeat code. The code originally succeeding the repeat code was written over the operation flag as the code succeeding the repeat code was shifted into the N register (FIG. 4) and, although the operation flag was also shifted into the I register (FIG. 4), the operation flag is never shifted back out of this register into the data stream. The positive FDLT signal is also gated through OR gate 194 to reset flip-flop 187.

As the data continues to circulate in the dynamic shift register, the separator code is eventually decoded by AND gate 203 to provide a positive SEP signal. The SEP signal is delayed one bit time by delay circuit 197 to generate a positive SEPD1 signal. Because flip-flop 189 remains set and flip-flop 212 has not been set, the positive SEPD1 signal enables AND gate 210 to generate a positive output signal that is gated through OR gate 211 to the set input of flip-flop 212. One bit time thereafter a positive INSFLG signal is provided at the Q output thereof. As the data continues its recirculation through the dynamic shift register, dummy codes are decoded by AND gate 201 to provide positive DMY signals. The output of AND gate 201 is connected to inverter 202 to provide $\overline{\text{DMY}}$ signal of binary value opposite to that of the DMY signal. The DMY signal is delayed one bit time by the delay circuit 208 to provide a DMYD1 signal. The DMYD1 signal is delayed one bit time through delay circuit 209 to provide a DMYD2 signal.

The beginning of the primary, or first, section of the memory may be defined as the coincidence of a positive $\overline{\text{DMY}}$ signal and a positive DMYD1 signal, both of said signals being applied to inputs of AND gate 207. The other inputs of AND gate 207 are also positive at this time because of the set conditions of flip-flops 189 and 212 as described above. Thus, AND gate 207 produces a positive output signal that is gated through OR gate 206 to the reset input of flip-flop 189. A positive $\overline{\text{REPEAT}}$ signal is generated at the $\overline{\text{Q}}$ output of flip-flop 189 at the following bit time. The positive REPEAT signal and the INSFLG signal are applied to AND gate 215 to produce a positive FOP signal at the output thereof that is supplied to operation flag inserter 213 to drive an operation flag onto data buss 49. The FOP signal is also gated through OR gates 221 and 222 to drive control lines B and C so that the operation flag is inserted into the data stream at the beginning of the primary section of memory. Simultaneously, the FOP signal is applied to the set input of flip-flop 217. At the next bit time, a positive INSERT signal is provided at the Q output of flip-flop 217 and is applied to an input of AND gate 220. Since no dummy codes are present in the primary section of the memory, no output is produced by AND gate 218. Thus, inverter 219 generates a positive output that is applied to the other input of AND gate 220, thereby providing a positive output signal that is gated through OR gate 221 to hold control line B positive. Control B is held positive to allow the data in the shift register to pass through the I register (FIGS. 2 and 4) of the shift register control logic, thereby providing an expansion of the memory by one character to allow for the insertion of the operation flag. During the succession of dummy codes beyond the end of the alternate section and before the beginning of the primary section, positive DMY and DMYD2 signals applied to AND gate 218 to provide a positive output from AND gate 218 that is applied to the reset input of flip-flop 217. At this time the positive level on control line B is dropped resulting in the trapping of one dummy code in the I register.

Assume now that a repeat operation is to be performed while the alternate section of the memory is being addressed. At the time that flip-flop 189 is set, a positive REPEAT signal is provided at the Q output thereof and is applied to an input of AND gate 216. When the beginning of the primary section of memory has reached the A register, the positive $\overline{\text{DMY}}$ and DMYD1 signals are also applied to AND gate 216. Thus, AND gate 216 provides a positive output that is gated through OR gate 211 to set flip-flop 212 at the next bit time. The positive INSFLG signal provided at the Q output of flip-flop 212 is applied to an input of AND gate 205. The positive REPEAT signal is applied to another input of AND gate 205. At the bit time after a separator code is decoded by AND gate 203, a positive SEPD1 signal is applied to the third input of AND gate 205, thereby providing a positive output signal from AND gate 205 that is gated through OR gate 206 to the reset input of flip-flop 189. Operation now proceeds for insertion of an operation flag at the beginning of the alternate section, just beyond the separator code, in the same manner as described above for inserting an operation flag at the beginning of the primary section of memory. The example shown in the timing diagram of FIG. 17 is applicable to a repeat operation performed in the primary, or first, section of the memory.

Figure 13:
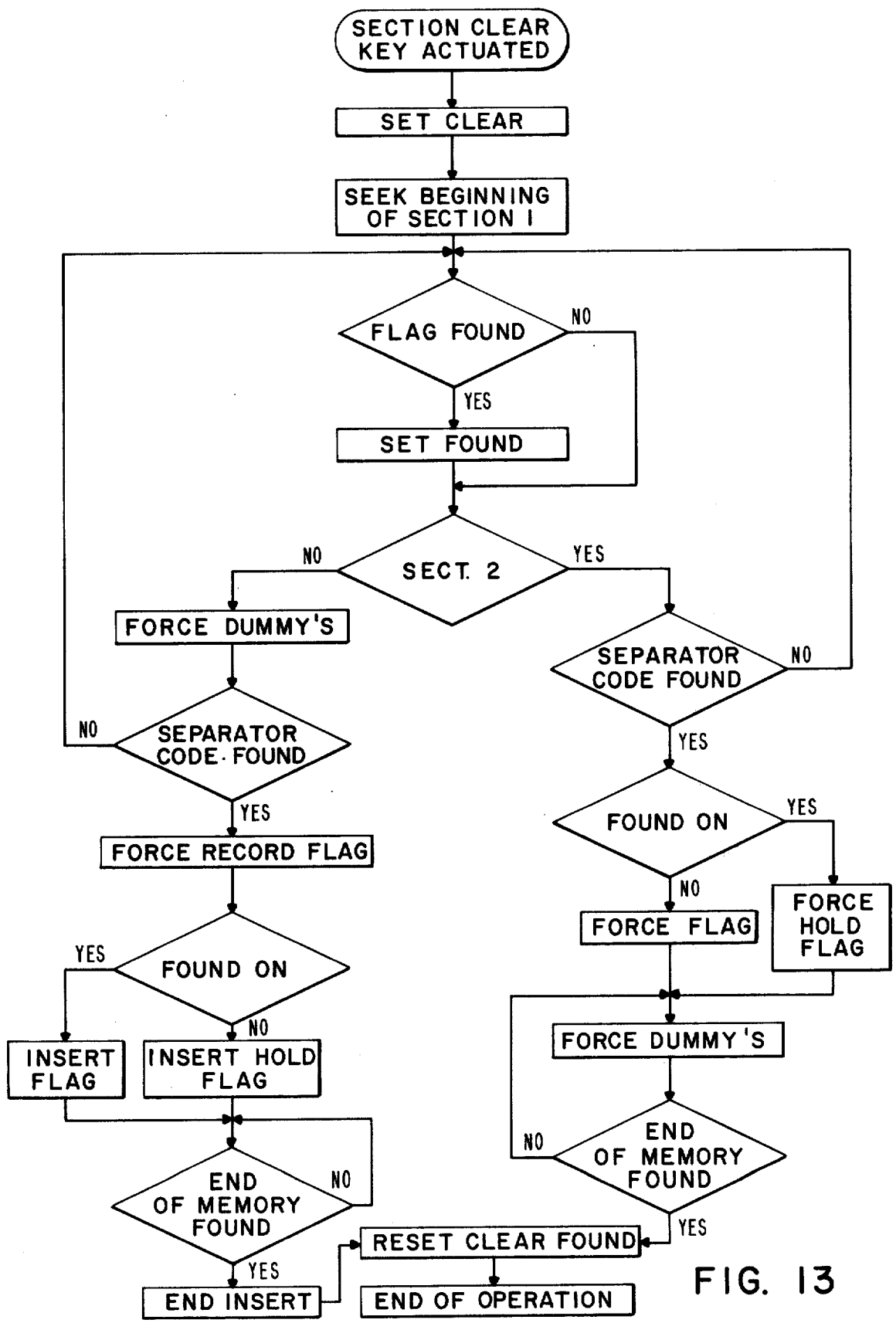
FIG. 13 is a flow chart illustrating the operation when one section of the buffer is to be cleared for insertion of the new text material.

Referring to FIG. 13, when a section is to be cleared and the memory organized in one of the sections is to be as shown in FIG. 6, the operator depresses the section clear key setting a clear latch and a scanning operation is initiated for seeking the beginning of the first section. If the first section is addressed, referring to the left leg of the flow diagram dummy codes are forced in, or written, over the characters and flags in that section until the separator flag is detected. If an operation flag had been detected in that section, since the latch (indicating the operation flag had been found) has been set, a new operation flag is written into memory prior to the separator code. If the latch had not been set, a hold flag would be written in that position. That is, if the found latch is not set, the hold flag is written into memory and the end of memory is sought whereupon the clear latch is reset ending the operation. If the second section is the section to be cleared, referring to the right leg memory is scanned for the separator code, and when found, the hold flag is written into memory if the latch is set. If the latch is not set, an operation flag is written into memory. In either event, dummy codes are written over the character codes until the end of memory is found and the latch is reset ending the operation.

Figure 20:
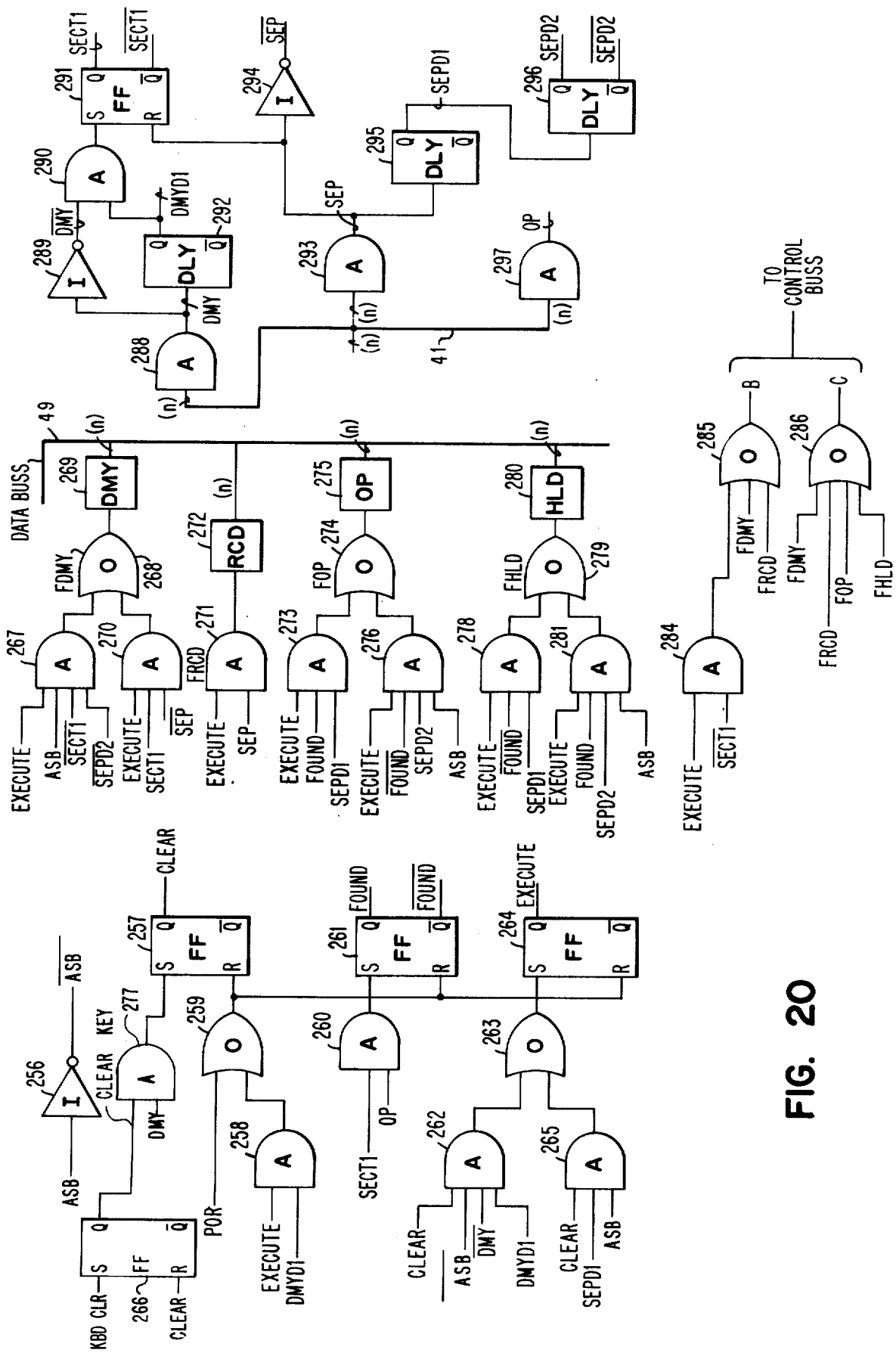

Referring now to FIGS. 20 and 21, a preferred embodiment is shown of a logical implementation of the section clearing operation described above and depicted by the flow diagram of FIG. 13. A positive ASB signal is always present while the alternate section button is latched down to address the alternate section of the memory. When the alternate section button is up to address the primary, or first, section of the memory the $\overline{\text{ASB}}$ output signal from inverter 256 is positive. The depression of a memory clearing key from the keyboard generates a positive KBD CLR signal to one bit time duration that is applied to the set input of flip-flop 266. A positive CLEAR KEY signal is provided by the Q output of flip-flop 266 at the next bit time and is applied to an input of AND gate 277. When a dummy code is decoded by AND gate 288, the resultant, positive DMY signal is applied to the other input of AND gate 277, enabling this AND gate to provide a positive signal to the set input of flip-flop 257. A positive CLEAR signal is provided at the Q output of flip-flop 257 at the following bit time and is applied to the reset input of flip-flop 266.

Assume that before the keyboard button was depressed for a memory clearing operation that the alternate section button was latched up to address the primary, or first, section of the memory. Thus, a positive $\overline{\text{ASB}}$ signal is provided by inverter 256 and is applied to an input of AND gate 262. The beginning of the primary section of the memory is detected by the coincidence of a positive $\overline{\text{DMY}}$ signal provided by the output of inverter 289 and by a positive DMYD1 signal provided by delay circuit 292. Thus, at the beginning of the primary section of the memory AND gate 262 provides a positive output signal that is gated through OR gate 263 to the set input of flip-flop 264. The positive $\overline{\text{DMY}}$ and DMYD1 signals were simultaneously applied to the two inputs of AND gate 290 to generate a positive output signal from this AND gate for application to the set input of flip-flop 291. With flip-flops 264 and 291 set at the following bit time, positive EXECUTE and SECT1 signals are applied to two of the three inputs of AND gate 270. As long as a separator code is not being decoded by AND gate 293, a positive $\overline{\text{SEP}}$ signal is generated by inverter 294 and is applied to the third input of AND gate 270. The positive output signal from AND gate 270 is gated through OR gate 268 to provide a positive FDMY signal that is applied to dummy code inserter 269, thereby forcing dummy codes onto the data buss to replace the characters in the first section of the memory that are to be cleared. The FDMY signal is also gated through OR gates 285 and 286 to drive control lines B and C during this time to enable the dummy codes on the data buss to be gated into the first section of the memory.

When the separator code is decoded by AND gate 293, a positive SEP signal is generated thereby. The $\overline{\text{SEP}}$ signal is no longer positive so that the output of AND gate 270 is no longer positive to force dummy codes into the memory. The positive EXECUTE and SEP signal enable AND gate 271 to provide a positive FRCD output signal that is applied to record flat inserter 272 to force a record flag onto data buss 49. The FRCD signal is also gated through OR gates 285 and 286 to drive control lines B and C, thereby allowing the record flag to be inserted into the primary section of the memory immediately following the last of the dummy codes just inserted. The positive SEP signal is also applied to the reset input of flip-flop 291 and to delay circuit 295.

At the following bit time the $\overline{\text{Q}}$ output of flip-flop 291 provides a positive $\overline{\text{SECT1}}$ signal and the Q output of delay circuit 295 provides a positive SEPD1 signal. At this bit time either an operation flag or a hold flag is forced onto the data buss for input into the primary section of the memory, depending upon the section of memory being addressed when this memory section clearing operation was initiated. Assume now that the operation flag was present in the primary, or first, section of memory before the clearing operation was begun. During the time that flip-flop 291 was set, a positive SECT1 signal was applied to one of the two inputs of AND gate 260. When the operation flag was decoded by AND gate 297, a positive OP signal was applied to the other input of AND gate 260 enabling an output signal therefrom that was applied to the set input of flip-flop 261, thereby providing a positive FOUND signal at the next bit time thereafter that is applied to an input of AND gate 273. During the bit time in which the SEPD1 signal is positive, AND gate 273 provides a positive output signal that is gated through OR gate 274 to provide a positive FOP signal that is applied to operation flag inserter 275 to drive an operation flag onto data buss 49. By this time, flip-flop 291 has become reset so that a positive $\overline{\text{SECT1}}$ signal is applied to an input of AND gate 284, thereby enabling a positive output therefrom that is gated through OR gate 285 to drive control line B. Control line C is driven at this time by the positive FOP signal so that the operation flag is inserted into the primary section of the memory immediately preceding the separator code. As the separator code and subsequent codes in the alternate section are shifted in the memory, control line B is held positive by the positive output signal from AND gate 284 that is gated through OR gate 285. One bit time after the first dummy code succeeding the alternate section is decoded, a positive DMYD1 signal from delay circuit 292 is applied to AND gate 258 along with the positive EXECUTE signal from flip-flop 264 to enable a positive output from AND gate 258 that is gated through OR gate 259 and applied to the reset inputs of flip-flops 257, 261, and 264.

If the hold flag, rather than the operation flag had been present in the primary section of the memory before the clearing operation was initiated, flip-flop 261 would not have been set upon insertion of the flag following the record flag. In this case, a positive $\overline{\text{FOUND}}$ signal would have been provided at the $\overline{\text{Q}}$ output of flip-flop 261. Application of the positive EXECUTE, $\overline{\text{FOUND}}$ and SEPD1 signals to AND gate 278 would have provided a positive output from AND gate 278 to be gated through OR gate 279 to provide a positive FHLD signal. The positive FHLD signal applied to hold flag inserter 280 would have forced a hold flag onto data buss 49 and would have driven control line C.

Control line B would have been driven by AND gate 284 and OR gate 285 in the manner described above.

Assume now that the alternate section button is latched down and a clearing operation is initiated. Flip-flops 266 and 257 are set as described above. During the scanning of codes in the primary section of the memory, flip-flop 261 becomes set if the operation flag is not found therein and remains reset if the operation flag is not found therein.

The positive ASB signal from the alternate section button is applied to an input of AND gate 265. At the bit time following the decoding of the separator code, the positive SEPD1 signal, applied to an input of AND gate 265, enables a positive output signal from this AND gate that is gated through OR gate 263 to the set input of flip-flop 264. At the following bit time, flip-flop 264 provides a positive EXECUTE output signal. Assume now that the operation flag is in the alternate section of the memory to be cleared and was not, therefore, found in the primary section of the memory. At the next bit time the positive EXECUTE signal is applied to an input of AND gate 276. The positive FOUND signal is applied to another input of AND gate 276 and the positive ASB signal is applied to a third input of this AND gate. At the bit time following the time during which SEPD1 is positive, a positive SEPD2 signal is provided by delay circuit 296 and is applied to the fourth input of AND gate 276, thereby enabling a positive output therefrom that is gated through OR gate 274 to generate a positive FOP signal. The positive FOP signal drives operation flag inserter 275 to force an operation flag onto data buss 49. Control line B is driven positive at this time by AND gate 284 and OR gate 285 in the same manner as in the primary section memory clearing operation described above. The FOP signal is gated through OR gate 286 to drive control line C, thereby enabling the operation flag on data buss 49 to be gated into the alternate section immediately following the separator code. At the next bit time thereafter, the $\overline{Q}$ output of delay circuit 296 provides a positive $\overline{SEPD2}$ signal that is applied to an input of AND gate 267. Since all other inputs of AND gate 267 are positive, a positive output signal provided thereby is gated through OR gate 268 to provide a positive FDMY signal. The FDMY signal is applied to dummy code inserter 269 to force dummy codes onto data buss 49. The positive FDMY signal is also gated through OR gates 285 and 286 to hold control lines B and C positive while the dummy codes are forced onto the data buss, thereby enabling the codes in the alternate section to be replaced by dummy codes. Had the operation flag been found in the primary section of the memory, the positive FOUND signal, applied to AND gate 281, would have resulted in the insertion of a hold flag, rather than an operation flag, at the bit time during the positive SEPD2 signal.

The solid lines in the left portion of the timing diagram of FIG. 21 depict a clearing operation of the primary section with the operation flag contained therein before clearing. The dotted lines show the timing sequence that would occur if the hold flag rather than the operation flag, were located therein before clearing. Similarily, the solid lines of the right portion of the timing diagram of FIG. 21 depict an alternate section clearing operation when the operation flag is contained in the alternate section. The dotted lines show the timing sequence that would occur if the hold flag were in the alternate section.

From the above, it can be seen that a system is provided which makes use of the two page movable partition in memory with the switch codes in the sections being used to merge text during printout. The text and switch codes can be entered into memory from a media device such as a record reader and more than one set of variables can be inserted into one of the sections in memory. Through the use of two different flags (operation and hold) and the exchanging of the flags upon encountering a switch code, a composite output can be produced. Also, stop codes can be used for ending an operation requiring the manual switching from one section to another.

Another important feature includes the attempted switching of the operation and hold flags when one of the sections is empty. In this event, a "j" is printed notifying the operator that a section is empty and the switching operation does not take place.

In summary, a shift register memory is organized so that multiple jobs can co-exist in storage. The shift register is divided into two sections and the operator can address either section by operating an alternate section button. When the button changes states, the position of the operation and hold flags are exchanged and all operations continue to sync off of the operation flag as if there were only one section of the shift register, and operation in one section will not alter the data in the other. By recording switch codes along with the text data stored in the sections, operating points are defined for exchanging the operation and hold flags automatically. That is, if data is being played out from one section and a switch code is encountered, the operation flag and hold flag are exchanged automatically and playout continues from the point of the operation flag. Therefore, if the memory has been properly organized and switch codes have been properly recorded along with text data, the next data in one section is merged with the text data in another section to produce a composite output during printout.

Also, manual operation is envisioned where stop codes are used for stopping printout with the operator operating the alternate section button and causing the other section to be addressed and the hold flag and operation flag to be exchanged.

There is no restriction on which section should contain a specific set of data. That is, if the consideration is fixed data for a form letter and variable data containing various names and addresses, there is no restriction on which section should contain the fixed or variable data, nor which section should be first addressed. Also, there is no restriction on which section playout is initiated from when recorded data and switch codes are to be input from an attached media device. The first section can contain the fixed data with the alternate section button up and the second section can contain the variable data with alternate section button down. In this case, the second section may be cleared with a page clear button so that additional variable data such as names and addresses of persons to receive the same form letter may be read in from the media device without having to input the form letter again. If the variable data is input to the second section and this section is addressed with the alternate section button down, then the alternate section button only has to be operated once for the entire operation. For example, the procedure followed by the operator would be to store the form letter with the alternate section button up, the first set of variable data with the alternate section button down, and then initiate printout.

The storing of text data which has been recorded for beginning and ending printout can be as follows:

| Printout beginning and ending in fixed text section |
|---|
| Fixed (x)(x)(x)(s)(x)(x)(x)(x)(s)(x)(x)(s)(REPEAT) |
| Variable (s)(x)(x)(s)(x)(s)(STOP)(s)(x)(s)(x)(x)(s)(STOP) |
| Printout beginning in fixed text section and ending in variable text section |
| Fixed (x)(x)(s)(x)(x)(x)(s)(REPEAT) |
| Variable (s)(x)(s)(x)(STOP)(s)(x)(s)(x)(STOP) |
| Printout beginning and ending in variable text section |
| Fixed (x)(s)(x)(s)(REPEAT) |
| Variable (x)(s)(x)(s)(x)(STOP)(x)(s)(x)(s)(x)(STOP) |
| Printout beginning in variable text section and ending in fixed text section |
| Fixed (x)(s)(x)(s)(REPEAT) |
| Variable (x)(s)(x)(s)(STOP)(x)(s)(x)(s)(STOP) |

In some cases playout will be initiated from the second section even though the first printing comes from the fixed data in the first section. This is due to the positions of the switch codes.

While the invention has been particularly shown and described with reference to several embodiments, it will be understood by those skilled in the art that various changes in form and detail may be made without departing from the spirit and scope of the invention.

What is claimed is:

1. A method of merging groups of data codes stored in a memory upon output of said codes to a printer, said method comprising the steps of:
   dividing said memory into sections by a first separator control code generated by a separator control code generator;
   storing in one section of said memory (a) a second operating point control code generated by an operating point control code generator, (b) data codes, and (c) at least one switch code;
   storing in another section of said memory (a) a third holding point control code generated by a holding point control code generator, (b) data codes, and (c) at least one switch code;
   decoding said codes by a decoder;
   outputting from said memory to said printer said data codes adjacent said second control code in said one of said sections until said switch code in said one of said sections is decoded adjacent said second control code;
   exchanging the memory locations of said second and third control codes in said memory sections; and
   outputting to said printer said data codes adjacent said second control code insaid another of said sections.

2. The method of claim 1 wherein said exchanging said second and third control codes further comprises:
   writing another third control code over said second control code in said one of said sections when said switch code is decoded adjacent said second control code.

3. The method of claim 2 wherein said exchanging said second and third control codes further comprises:
   writing another second control code over said third control code in said another of said sections when said switch code is decoded adjacent said second control code.

4. A system for arranging and storing groups of data codes in a memory for merging said groups of codes upon output of said codes to a printer, said system comprising:
   a. first means for inputting (1) a first separator control code into said memory to partition said memory to establish two sections in said memory, (2) data codes and switch codes into each of said sections of said memory, and (3) a second operating point control code into a first of said sections for defining an operating point in said memory and a third holding point control code into a second of said sections for defining a holding point in said memory;
   b. second means coupled to said first means for inputting, for decoding said control, data, and switch codes;
   c. third memory outputting means, upon decoding said second control code by said second means, for outputting a data code adjacent said second control code, from said first of said sections of said memory to said printer and for advancing said second control code through said first of said sections of said memory after each of said data codes adjacent said second control code is output until one of said switch codes is decoded adjacent said second control code;
   d. fourth means, upon said switch code being decoded by said second means, for exchanging the memory locations of said second control code and said third control code; and
   e. fifth means included in said third means, upon again decoding said second control code by said second means, for outputting a data code adjacent said second control code in said second of said sections of said memory to said printer and for advancing said second control code through said second of said sections of said memory after each of said data codes adjacent said second control code is output.

5. The system of claim 4 wherein said fourth means includes means, upon decoding said switch code, for writing another third control code over said second control code in said first of said sections of said memory.

6. The system of claim 5 wherein said fourth means includes means for writing another second control code over said third control code in said second of said sections of said memory.

7. The system of claim 6 wherein said forth means includes inhibiting means for inhibiting the input of a second control code into another memory section containing a third control code when said another memory section has no data codes past said third control code.

8. The system according to claim 7 wherein said first means includes means for inputting repeat codes into said sections of said memory, and said second means includes means for decoding said repeat codes, and furter comprising means for repeating the outputting of data codes from the section containing said second control code to said printer in response to a repeat code being decoded adjacent said second control code.

9. The system according to claim 8 further comprising means for deleting data codes from either of said sections of said memory.

10. The system of claim 9 wherein said memory further comprises a dynamic shift register.

* * * * *